United States Patent [19]

Masai et al.

[11] Patent Number: 5,065,311
[45] Date of Patent: Nov. 12, 1991

[54] DISTRIBUTED DATA BASE SYSTEM OF COMPOSITE SUBSYSTEM TYPE, AND METHOD FAULT RECOVERY FOR THE SYSTEM

[75] Inventors: Kazuo Masai, Yokohama; Satoshi Wakayama, Hiratsuka; Shoji Yamamoto, Chigasaki; Takashi Sumiyoshi; Masao Makino, both of Yokohama, all of Japan

[73] Assignee: Hitachi, Ltd., Tokyo, Japan

[21] Appl. No.: 184,075

[22] Filed: Apr. 20, 1988

[51] Int. Cl.$^5$ ............................................. G06F 11/00
[52] U.S. Cl. ...................... 364/200; 364/268.9; 364/285.3; 364/285.2; 364/282.1
[58] Field of Search ... 364/900 MS File, 200 MS File, 364/300; 371/11, 12, 16.5, 11.2, 11.3, 9.1

[56] References Cited

U.S. PATENT DOCUMENTS

| | | | |
|---|---|---|---|
| 3,736,566 | 5/1973 | Anderson et al. | 371/12 |
| 3,838,260 | 9/1974 | Nelson | 371/16.5 |
| 4,377,000 | 3/1983 | Staab | 371/11 |
| 4,503,535 | 3/1985 | Budde et al. | 371/11 |
| 4,570,261 | 2/1986 | Maher | 371/16 |
| 4,604,686 | 8/1986 | Reiter et al. | 364/200 |
| 4,633,467 | 12/1986 | Abel et al. | 371/16 |
| 4,648,031 | 3/1987 | Jenner | 364/200 |
| 4,665,520 | 5/1987 | Strom et al. | 371/7 |
| 4,697,266 | 9/1987 | Finley | 371/12 |
| 4,703,481 | 10/1987 | Fremont | 371/12 |
| 4,710,926 | 12/1987 | Brown et al. | 371/11 |
| 4,819,156 | 4/1989 | DeLorme et al. | 364/200 |
| 4,852,092 | 7/1989 | Makita | 371/12 |
| 4,868,744 | 9/1989 | Reinsch et al. | 364/280.3 |
| 4,872,165 | 10/1989 | Mori et al. | 371/11.2 |
| 4,878,167 | 10/1989 | Kapulka et al. | 364/200 |

*Primary Examiner*—Allen R. MacDonald
*Assistant Examiner*—Gopal C. Ray
*Attorney, Agent, or Firm*—Antonelli, Terry, Stout & Kraus

[57] ABSTRACT

In a composite system in which a plurality of data base systems and data communication are treated as respective subsystems. At the occurrence of a fault in one subsystem, other subsystems are allowed to operate continuously, thereby facilitating recovery after a faulty subsystem has started up. A controller performs as to which data base system a transaction in execution has accessed so that the range of failure is confined, thereby facilitating the fault recovery. The check points of two processings including updating of information in the memory and accumulation of the updated information in the journal are detected so that the need of journals for information occurring earlier than the check point is eliminated, and a check point dump is acquired without waiting for the end of a transaction which has been active at the check point.

7 Claims, 15 Drawing Sheets

SYSTEM STATUS TABLE

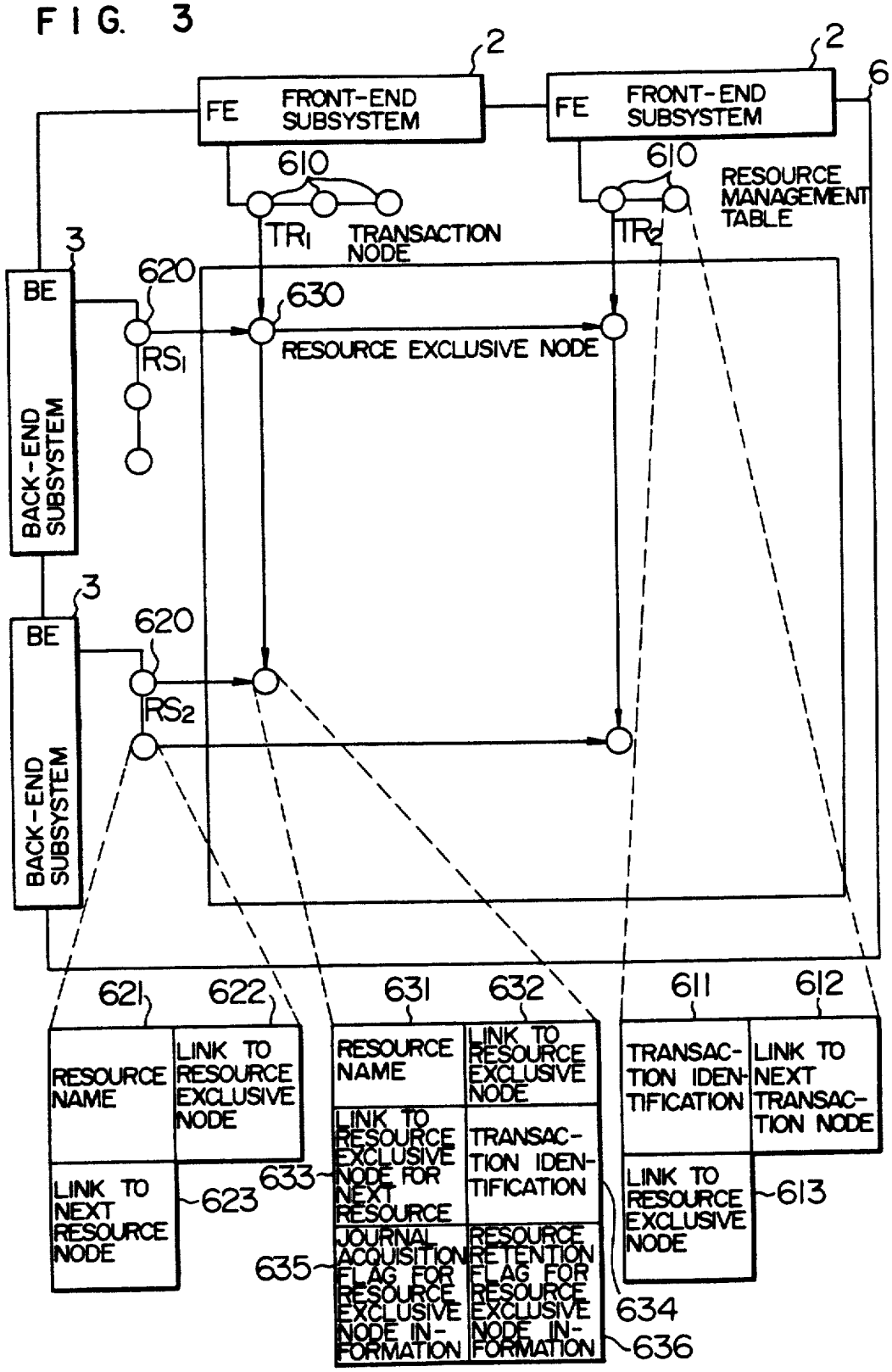

DISTRIBUTED DATA BASE SYSTEM OF COMPOSITE SUBSYSTEM TYPE, AND METHOD FAULT RECOVERY FOR THE SYSTEM

BACKGROUND OF THE INVENTION

This invention relates to a control method for a distributed data base and, particularly, to a distributed data base system of the composite subsystem type suitable for a joint operation with another plurality of data bases, and also to a method of fault recovery for a composite subsystem type online system.

In the conventional recovery control method for a distributed data base, as described in the proceeding of the 33rd (latter term of 1986) annual convention of Information Processing Society of Japan, pp. 907-908, a system down condition at a distributed site is not considered to be a system down condition of other sites, and a system down condition of a slave site is detected and isolated by a master site and a system down condition of the master site is detected by a slave site and the abnormality of the master site is indicated by the slave site to other slave sites. In consideration of resumption of operation, the process of updating the data base uses a 2-phase protocol which is described in the publication "Principles of Data Base System", 1980, pp. 340-356, by Jeffrey D. Ullman, Computer Science Press. This allows the recovery without the occurrence of an inconsistency in the data even if a distributed site has gone down during the updating process in synchronism with data bases of other sites.

However, a down condition in the distributed data base access section within a distributed data base is not separated from a down condition of a local data base, and therefore a down condition in one site results in a down condition for both distributed access and local access.

The above-mentioned prior art does not treat separately the distributed data base access section within a distributed site and the local data base access section within a site, and therefore a down condition in a site always results in a distributed data base access down condition and a local data base access down condition, which creates a reliability problem.

In the conventional fault recovery method for an independent online system, as described for example in JP-A-54-114145, the system has an audit file (journal file) and a check point file (and a before look file in some cases) to sample journal and check point information in preparation for faults,, and at the time of occurrence of a fault, the system attempts recovery using the journal and check point information corresponding to the fault. The online system to which the recovery method is applicable is confined to one having one data communication section and one data base section.

The above-mentioned prior art does not take into consideration fault recovery for a composite subsystem type online system, and in such system configuration each subsystem needs to have its own journal and to try fault recovery independently. However, when a job process (transaction) across several subsystems arises, a recovery process in synchronism with each other subsystem cannot take place, despite the need for synchronous information for recovery among the subsystems. The recovery of a transaction may be tried in synchronism after the faulty subsystem has started up, however, in case a subsystem does not start up promptly after occurrence of a fault, the remaining subsystems will have a transaction which is left unrecovered. Therefore, journal information necessary for the recovery of the transaction needs to exit continuously. If the online operation is resumed in this situation, the journal necessary for the recovery of the faulty transaction is buried in journals produced later, and the system is compelled to look for the journal information buried in the mass of journals after the faulty subsystem has recovered. On this account, at the time of occurrence of a fault in one subsystem, it is necessary to halt all subsystems and, after starting up all the subsystems, recover all transactions before resuming the online operation.

To cope with this problem, when journals of all subsystems are unified so that synchronous information for information updating is useful even if some subsystems do not start, information for other than the faulty subsystem can be recovered, however, in this case the journal needed by the faulty subsystem is buried in the unified journal, resulting also in a problem of looking for a necessary journal in the mass of journals.

Furthermore, in the conventional online system of the composite subsystem type, each subsystem individually controls the state of access to the data base controlled by it. In case one transaction has updated data in a plurality of data base systems, the 2-phase committing method is used to guarantee the consistency of updating of the data base systems by the transaction. The 2-phase committing method is described in the publication "Principles of Database Systems", pp. 351-356, by Jeffrey D. Ullman, COMPUTER SCIENCE PRESS, 1980.

In the 2-phase committing method, a subsystem which has received a transaction reports the commencement of the transaction to all data bases prior to the access to the data base of the transaction. Upon receiving the report, each data base appends an identifier to the transaction for distinction among transactions in its own system, and returns it to the data communication system. In terminating the transaction, the data communication system specifies the identifier of each transaction and directs each data base to have a commit preparation for the transaction, as a first phase. The commit preparation is a preprocessing to guarantee the completion of the transaction, and it generally corresponds to the journal output process.

After receiving the commit preparation end reports from all directed data bases, the subsystem issues a commit instruction. If even a single data base has failed in commit preparation, the subsystem indicates the failure of the transaction to all data bases. Upon receiving the failure of the transaction, each data base reads the journal of the transaction produced in the commit preparation process, thereby implementing the data base restoration process.

In case one of data bases in the online system has failed, the whole system is brought to an abnormal termination so as to suspend all transactions in execution. After that, fault recovery processes for all transactions which have been in execution are carried out for each subsystem based on the journal.

In case a transaction in execution continues to be processed without suspension at the time of occurrence of a fault, the commit preparation will fail at the end of the transaction in execution, and the restoration process for the transaction will be carried out by all data base systems accessed by the transaction.

In the above-mentioned prior art, if a data base in an online system fails, it is not possible to find the transaction which has accessed the data base, and therefore all transactions in execution are subjected to fault recovery by bringing the whole system to an abnormal termination.

However, viewing the realistic job affair, even in such an online system including a plurality of data bases as mentioned above, a transaction in most cases makes access only to one data base, and there is little proportion of transactions making access to a plurality of data bases.

In the conventional method, when a data base in an online system has failed and not only the transaction in access to the failing data base but all transactions in execution are involved in the subject fault, even transactions which can proceed to normal processings are subjected to fault recovery. Namely, it is not intended positively to minimize the range of influence of a fault, and this is a problem in operating the system.

In the case of a method which allows transactions in execution to continue to be processed and detects a transaction in need of fault recovery at the end of each transaction, even the transaction which already made access to the faulty subsystem at the occurrence of the fault goes on processing, and it will become necessary for the transaction, if updating continuously for other data base systems other than the faulty data base system, to have a great deal of restoration processes at the end of the transaction.

In the conventional check point acquisition process which is necessary for the fault recovery process, the process enters the wait state at the time of the check point until all transactions in execution are complete, as described for example in JP-A-58-2936. This is because transactions in execution are making access to the table which is the subject of the check point dump, and therefore if the acquisition of the check point dump is started during the execution of the transaction, it will be, in case of journal acquisition before the time of the check point and table updating after the time of the check point, that the journal before the time of the check point is necessary at the time recovery of the table.

The above-mentioned prior art does not consider a transaction which is in execution in a faulty subsystem and a transaction which does not terminate for a long period, such as the case of a transaction in execution in another host machine in a distributed data base, as has been experienced in the advent of composite subsystem type online systems, and the check point acquisition and validation cannot take place when a long term transaction exists, resulting in an abnormally long check point interval, which imposes not only a long fault recovery time, but the need of maintaining all external storages which contain journals in the accessible condition at the time of recovery.

SUMMARY OF THE INVENTION

Accordingly, it is a first object of this invention to provide a distributed data base system of the composite subsystem type, in which access control of distributed data bases is constructed as subsystems of composite subsystems so that access to a local data base can be continued in the event of the distributed data base access section going down.

The second object of this invention is that, in a online system of the composite subsystem type, when some subsystem fails, subsystems other than the faulty subsystem are allowed to operate continuously so that the recovery after the faulty subsystem has started up is facilitated.

The third object of this invention is that, in an online system of the composite subsystem type, when some subsystem fails, the range of fault is confined so that the following fault recovery process is facilitated.

The fourth object of this invention is that, in the fault recovery process, the check point acquisition and validation are allowed to take place without waiting for the end of the transaction so that the journal and check point are consistent at the time of recovery, i.e., once the check point is validated, the access to journals produced earlier than the check point is made unnecessary.

The first object is accomplished b separating the distributed data base from the local data base, making a portion, which operates on its site to generate a transaction in accordance with a request from another site of the distributed data base, to be a subsystem of the data communication type on the composite subsystem, assuming a portion, which receives a distributed data base request generated by a transaction, to be a subsystem of the data base type, constructing a system as an online system of the composite subsystem type, and dealing with a down condition of the local data base as a simple subsystem down condition. Namely, by treating the distributed data base access section as a subsystem, it becomes a subsystem different from the local data base. In the composite subsystem type online system, each subsystem has rerun information made separable so that a down condition of one subsystem does not compel another subsystem to go down simultaneously, and even if the distributed data access subsystem goes down, the controller of the composite subsystem closes only transactions which need a distributed data base access and proceeds to the transaction process which can be completed through another local data base access, whereby the distributed data base access down condition can be isolated from the local data base access and the overall system down condition can be prevented.

The second object of the invention is accomplished by providing the composite subsystem type online system with a file for saving, for individual transactions, journals which become necessary at times of recovery, and a journal produced by a transaction in operation at times of check points is saved in a journal saving file, so that if a fault occurs in a subsystem, other subsystems than the faulty subsystem are allowed to run continuously and recovery is accomplished after the faulty subsystem has been started up.

Journals produced by individual subsystems are acquired in a unified journal file. Each journal, if it is a journal produced for a transaction in operation at the time of a check point, is stored in the journal saving file. The journal saving file is partitioned for each transaction, and journals are stored by being arranged for individual transactions.

If a subsystem fails, it is necessary to recover all transactions which have used the subsystem. In order to get journals needed by a transaction which has used the failed subsystem, the controller of the composite subsystem type online system reads out all journals produced after the time of the check point and additionally writes a necessary journal into the journal saving file. At the end of this operation, all journals needed by transactions for recovery are collected in the journal saving file. Using information in the journal saving file, a recovery of transactions is conducted. Although information pertinent to a subsystem in operation among subsystems used by transactions is recovered promptly, information of subsystems which do not yet start up will be recovered later. Since necessary journals are all collected in the journal saving file, even if the faulty subsystem starts up late, the transaction will be recovered at that time point.

The third object of the invention is accomplished as follows. The composite subsystem type online system is provided with a controller, and a subsystem, upon receiving each transaction to be executed by the system, registers the transaction in the controller. In case of a transaction making access to a specific data base, the access request is held temporarily by the controller, the required data base is identified from the content of the request, and, after recording the access of the transaction to the data base, the access request of the transaction is assigned to the data base. In this way, the controller determines in which subsystem the transaction had arisen and to which data base it has accessed, so that if a data base in the online system fails, only transactions affected by the fault of the data base are selected.

All transactions which have arisen in the online system are registered in the controller by the subsystem which has received them, and data bases accessed by the transactions are under control of the controller individually by the associated common distributing facility. In this manner, if a data base in the online system fails, transactions which have accessed the data base can be distinguished for fault recovery, only the process of the transactions can be suspended immediately at the time of failure, and the transactions can be prevented from successively updating other normal data base systems.

The fourth object of the invention is accomplished by having, for each transaction, a flag which indicates that the check point dump table is in access and a flag which indicates that the execution goes on at the time of the check point and the transaction is a questionable transaction, and by waiting for the end of table access by the transaction which is in execution at the time of check point and in access to the table.

Each transaction revises the check point dump table and sets the flag which indicates the access to the check point dump table until the journal corresponding to the revision (history type journal) is outputted. The check point dump acquisition task keeps on the flag indicative of a questionable transaction for the transaction which is in execution at the time of the check point. When the questionable transaction has gone out of the period in the check point dump table access, the flag indicating the access and the flag indicating the questionable transaction are both reset, and the check point dump acquisition task can know from the flags that the questionable transaction has gone out of the table access period (risky period). By commencing the check point dump acquisition and validation at the time point when all flags are reset, the check point dump can be acquired without the need for journals earlier than the time of the check point.

BRIEF DESCRIPTION OF THE DRAWINGS

FIG. 3 is a diagram showing the resource management table;

DESCRIPTION OF THE PREFERRED EMBODIMENTS

The following describes in detail an embodiment of this invention with reference to the drawings.

Figure 1:
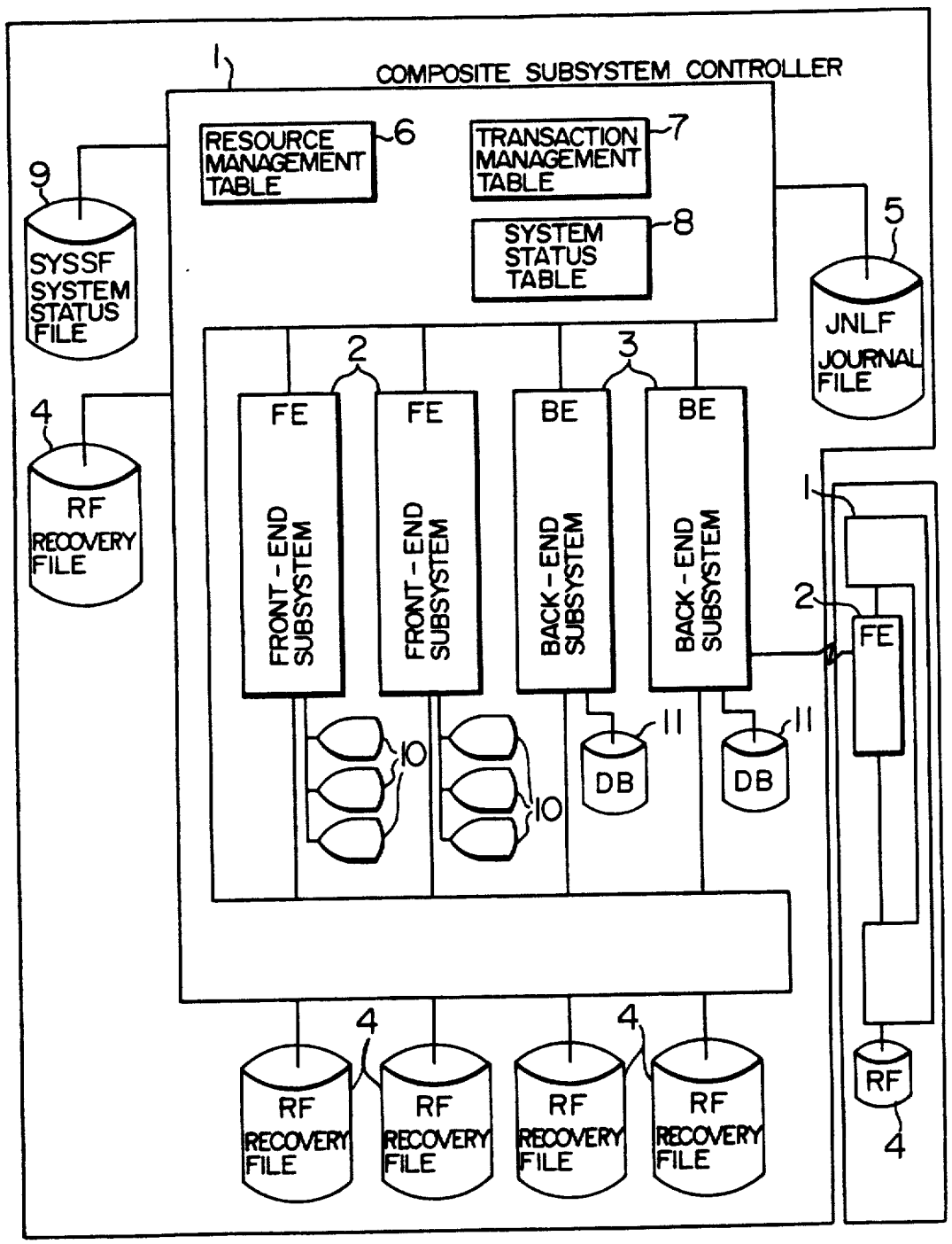
FIG. 1 is a block diagram showing the overall arrangement of a composite subsystem type online system.

FIG. 1 is an overall structural diagram of the composite subsystem type online system which embodies the invention.

In FIG. 1, the composite subsystem type online system consists of a composite subsystem controller 1 (termed simply "controller" hereinafter) which controls a plurality of subsystems, two types of subsystems (front-end type subsystems 2 and back-end type subsystems 3) submitting to the controller, recovery files 4 (termed simply "RF" hereinafter) dedicated to each subsystem and controller, a journal file 5 (termed "JNLF" hereinafter) for storing journals of all subsystems, a resource management table 6 which manages the status of resources of the overall system, a transaction management table 7 which manages transactions, a system status table 8 which manages the status of the system, and a system status file 9 (termed "SYSSF" hereinafter) which exists as a copy in an external storage.

The front-end subsystem 2 (termed "FE") has associated online terminals 10, and generates transactions which are units of job processing. The back-end subsystem 3 (termed "BE") has an associated data base 11, which is accessed in response to requests by the transaction generated by the FE 2.

The distributed data base system behaves as a subsystem having a role of FE (termed "distributive server") for receiving data base access requests from other processor and generating transactions in the self processor and a role of BE 3 (termed "distributive client") for receiving data base access requests to other processors from transactions. Accordingly, it is also possible to assume a distributed data base in part of the composite subsystem type online system.

Figure 2:
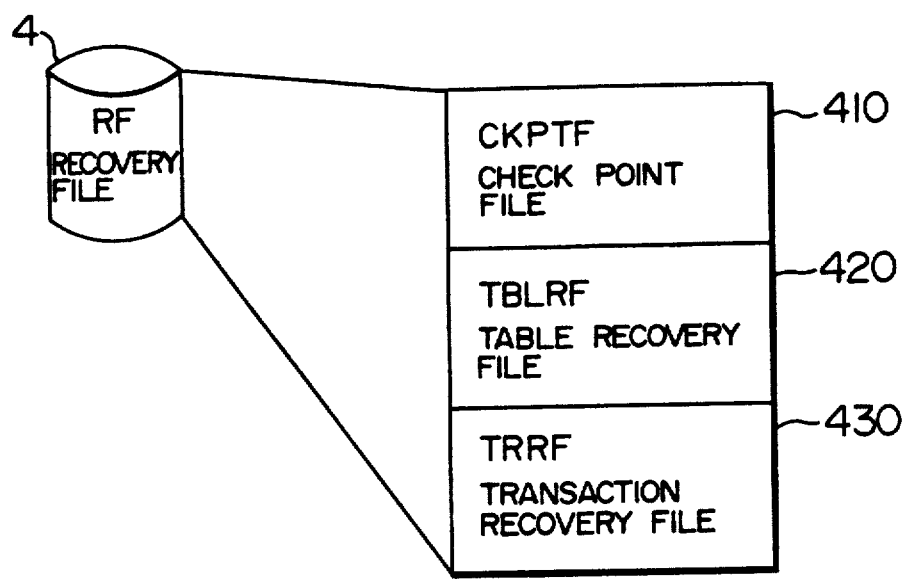
FIG. 2 is a diagram showing the recovery file.

FIG. 2 shows the structure of the recovery file 4. The RF 4 is the generic name of external storages dedicated to individual subsystems and controller 1 for storing recovery information in the event of a fault in a subsystem or overall system, and it consists of a check point file 410 for storing the check point dump, a table recovery file 420 used for recovering tables, and a transaction recovery file 430 for saving the journal of each transaction. The check point file 410 will be termed "CKPTF", the table recovery file 420 will be termed "TBLRF", and the transaction recovery file 430 will be termed "TRRF" in the following.

FIG. 3 shows the structure of the resource management table 6. The resource management table 6 consists of transaction nodes 610 queuing for each FE 2, resource nodes 620 queuing for each BE 3, and links 630 to resource exclusive nodes.

The transaction node 610 consists of a transaction ID section 611 in which the transaction ID is stored, a link 612 to the next transaction node, and a link 613 to the resource exclusive node. The resource node 620 consists of a resource name section 621 in which the resource name is stored, a link 622 to the resource exclusive node, and a link 623 to the next resource node. The resource exclusive node 630 consists of a resource name section 631, a link 632 to the next resource exclusive node which waits for the same resource, a link 633 to the resource exclusive node for the next resource which the same transaction holds or for which it waits, a transaction ID section 634, a flag 635 which indicates whether or not the resource exclusive node information has been acquired as a journal, and a flag 636 which indicates whether the resource exclusive node holds or waits for a resource.

In case one transaction TR1 holds a resource RS1, there exist transaction nodes 610 and resource nodes 620 corresponding to TR1 and RS1, respectively and resource exclusive nodes 630 connected by the link 613 and link 622 from the transmission node 610 and resource node 620, and the flag 636 indicative of exclusive hold or wait is set. In case of a transaction TR2 which waits for the resource RS1, a link 632 to the next resource exclusive node is produced from the resource exclusive node in linkage with TR1 and RS1, and another link 613 is also produced for TR2. For the resource node linked by TR2, the flag 636 indicating exclusive hold or wait is reset. By using the resource management table 6, a table of resources held by a specific transaction or the transaction name which holds a specific resource is obtained. Each exclusive node incorporates a flag 635 which indicates whether or not the exclusive node information has been saved in the journal.

Unification of the resource management table 6 on the controller 1 through subsystems not only allows holding of exclusive information, but also facilitates the detection of a deadlock across subsystems at the time of occurrence of a subsystem down condition.

Figure 4:
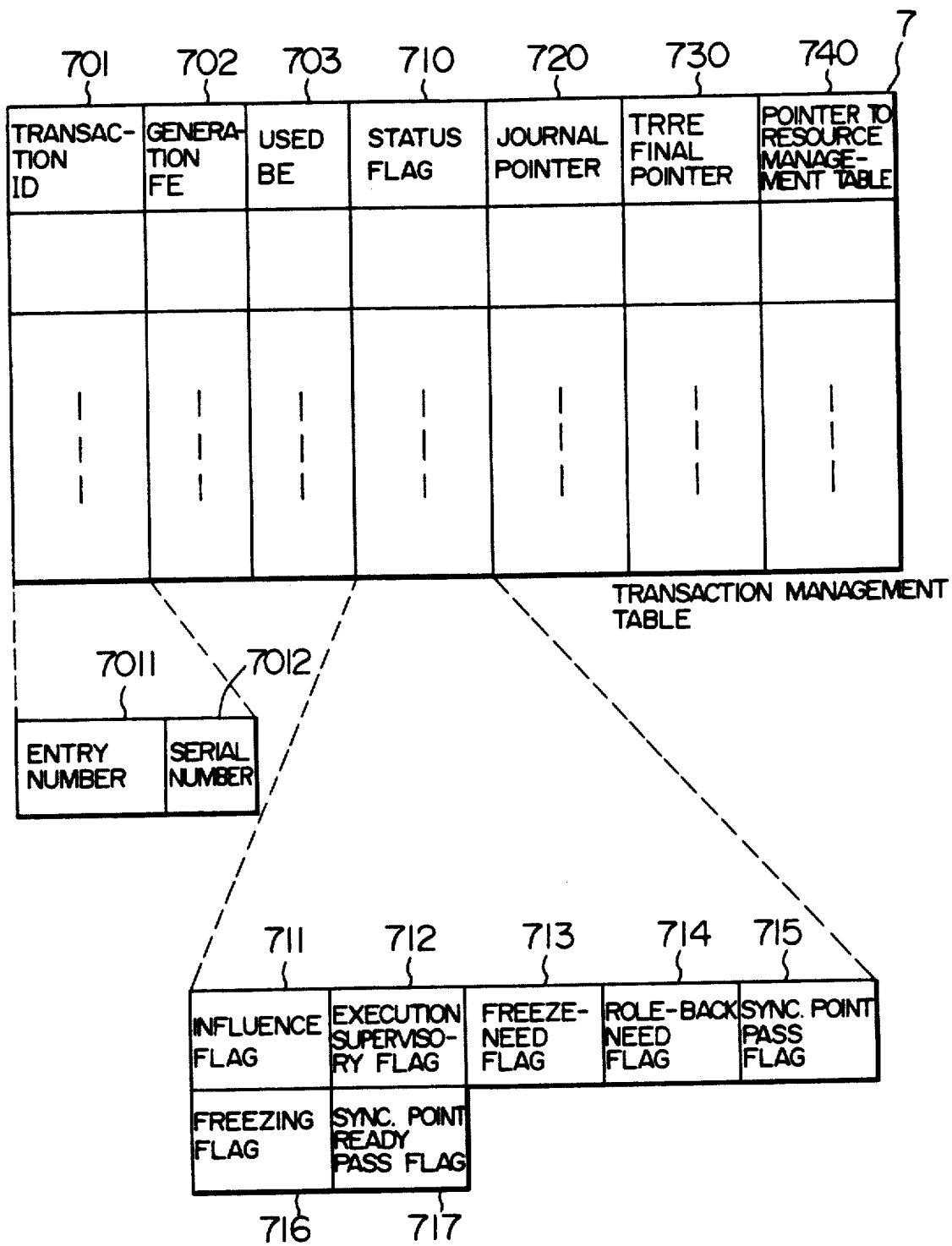
FIG. 4 is a diagram showing the transaction management table.

FIG. 4 shows the structure of the transaction management table 7. The transaction management table 7 is used to register all transactions which have been generated by each FE 2 at some time point.

The transaction management table 7 includes, for each transaction, entries including, a transaction ID 701 (consisting of an entry number 7011 of the table, and a serial number 7012 which is incremented at each use of the same entry), a generation FE area 702, a used BE area 703, a transaction status area 710, a journal pointer 720 to a journal which becomes necessary for the recovery of a transaction, a final pointer 730 of the transaction recovery file (TRRF) 430 for storing journals, and a pointer 740 to the exclusive node 630 of the resource management table. The transaction status area 710 includes a synchronizing bit, i.e., affection flag 711 at the check point dump acquisition, an execution supervisory flag 712, a transaction freeze-need flag 713 for controlling the freezing of a transaction, a roll back flag 714 indicating the need of roll back recovery, a sync point flag 715 indicating whether or not the transaction has passed the sync point, a freezing flag 716 indicating that the transaction is frozen, and a sync point prepared flag 717 indicating that the transaction has prepared for the sync point and has not yet passed the sync point.

Figure 5:
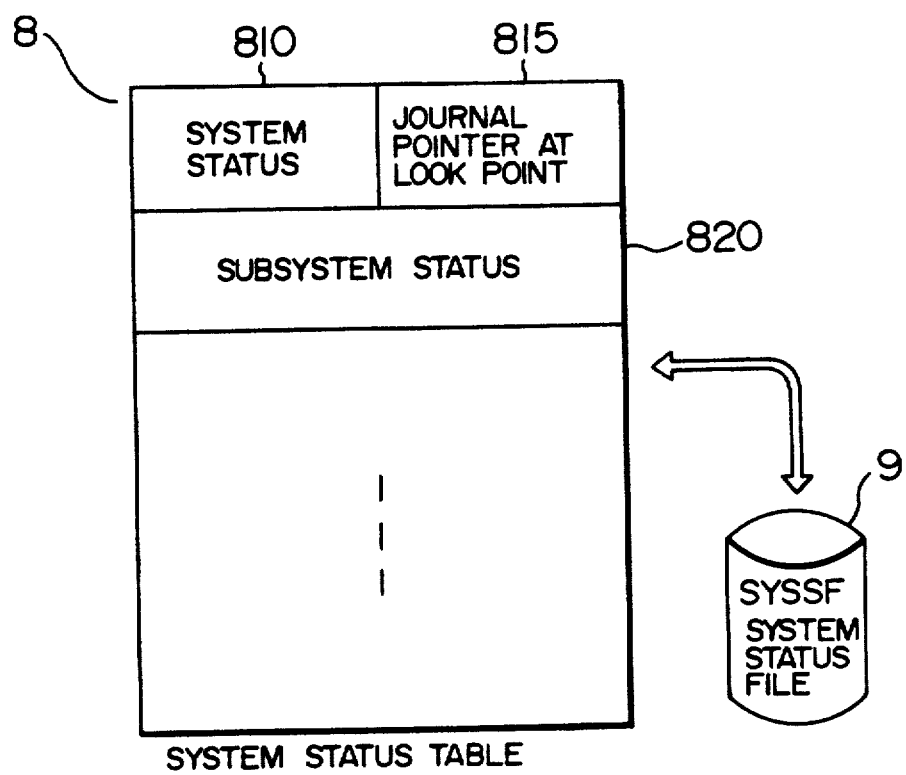
FIG. 5 is a diagram showing the system status table.

FIG. 5 shows the structure of the system status table 8. The system status table 8 consists of areas for recording the state 810 of controller 1, the state 820 of each subsystem, and the journal serial number 815 at the time of a check point of the system.

Each entry in the system status table 8 is written to the SYSSF 9 at each updating, to keep the copy of the system status table in the SYSSF 9.

The composite subsystem type online system of this embodiment goes on with the job process, while outputting various information to the external storage to prepare for recovery. The resource (a generic term for data and information) to be recovered is briefly broken down into the following two types.

(1) Volatile resources, such as tables in the virtual memory, which are lost at the occurrence of a fault.

(2) Non-volatile resources, such as a data base in an external storage, which generally retain the states at the occurrence of a fault even at the occurrence of the fault.

For the recovery of the volatile resource, which is lost at the occurrence of a fault, the resource is copied periodically into a non-volatile external storage (this copy is called a "check point dump"). After acquisition of a check point dump, differential information at each alteration is acquired as a journal, and the resource can be recovered by superimposing the journal information on the check point dump. This type of journal is called a "history type journal".

For the recovery of a non-volatile resource, which retains the states at the occurrence of a fault, the journal is acquired at each alteration. At recovery, it is determined whether updating is completed for each transaction which is the unit of job process or updating is invalidated, and at each alteration, information before the journal alteration is superimposed or information before the alteration is superimposed. This type of journal is called a "transaction type journal".

The system of this embodiment implements a journal output prior to the updating of data base and table in preparation for the fault recovery. To unify subsystems journal output is done to a single journal file (JNLF) 5 using functions of the controller. Unification of JNLF 5 contributes significantly to the enhancement of the operation in operating the composite subsystems. The following describes the method of journal acquisition.

Journal acquisition always takes place before the data base or table is updated. If alteration precedes journal acquisition, recovery will be impossible in case a fault occurs before the journal has been acquired following the alteration.

At the end of a transaction, after the transaction has outputted all journals, a journal indicating that all journals have been outputted, i.e., indicative of a sync point, (termed "sync point journal" hereinafter) is outputted.

For a transaction in which the sync point journal exists as a journal, all transaction type journals which are necessary for the recovery of non-volatile resources exist, and therefore a recovery in the direction of completing the transaction process can take place. In contrast, for a journal in which the sync point journal does not exist, although it is not guaranteed that all journals have been outputted, journals are surely outputted before alteration, and therefore a recovery in the direction of invalidating the transaction can take place using information existing before alteration of the existing journals.

After the transaction has been completed, a journal indicating the termination of transaction is acquired. This journal is called a "termination journal". After the termination journal has been outputted, recovery by the transaction type journal becomes unnecessary.

In the case of a distributed data base, one transaction updates the data base in its own system and data bases in other processors, giving rise to the need for synchronism of data bases among processors. The following describes the method of journal acquisition in the case of a distributed data base.

At the end of a transaction, all journals on the side of the distributed data base are outputted. At this time point, the distributed client side directs the distributed server side to output all journals (called "sync point preparation instruction" hereinafter). Receiving the sync point preparation instruction, the distributed server side outputs a journal indicating the completion of sync point preparation following the output of all journals (called "sync point preparation journal" hereinafter). Upon completion of output of the sync point preparation journal, the distributed server reports the completion of sync point preparation to the distributed client. On the side of the distributed client, the sync point journal is outputted following the output of all journals in that system of the transaction and the reception of the sync point preparation completion report from the distributed servers of all other processors which have issued requests. Upon completion of output the sync point journal, the distributed client updates the data base in its own system, and indicates to the distributed server that the transaction has reached the sync point (called "sync point instruction" hereinafter). Receiving the sync point instruction, the distributed server outputs the sync point journal and thereafter completes data base updating for the transaction left in the buffer. After that, it outputs the termination journal, and reports the completion of transaction to the distributed client on completion of output. Following the updating of the data base in its own system and the reception of the completion reports from all distributed servers to which the instructions have been issued, the distributed client side outputs the termination journal.

On the distributed client side, if the sync point journal exists, recovery in the direction of validating the transaction takes place, or if it does not exist, recovery in the direction of invalidating the transaction can take place. On the side of the distributed server, recovery in the direction of validating the transaction takes place if the sync point preparation journal and sync point journal exist, or recovery in the direction of invalidating the transaction takes place if the both of the sync point journal and sync point preparation journal do not exist. In case only the sync point preparation journal exists, the presence or absence of the sync point journal on the side of the distributed client is examined, and recovery takes place accordingly.

In case a conventional type online system, which has its own journal file in the processor and acquires the journal, is connected and the data base of the composite subsystem type online BE3 is updated from a transaction executed under the online system, the online system is treated as an FE2 similar to the distributed server, and using the above-mentioned journal acquisition method, recovery can take place with synchronism being provided between data base updating in the online system and data base updating for BE3 of the composite subsystem type online system.

In this embodiment, the table to be recovered is acquired periodically as a check point dump for each subsystem and the transaction type journal is saved in the TRRF 430 at the sync point. The following describes the method of each information acquisition.

Figure 6:
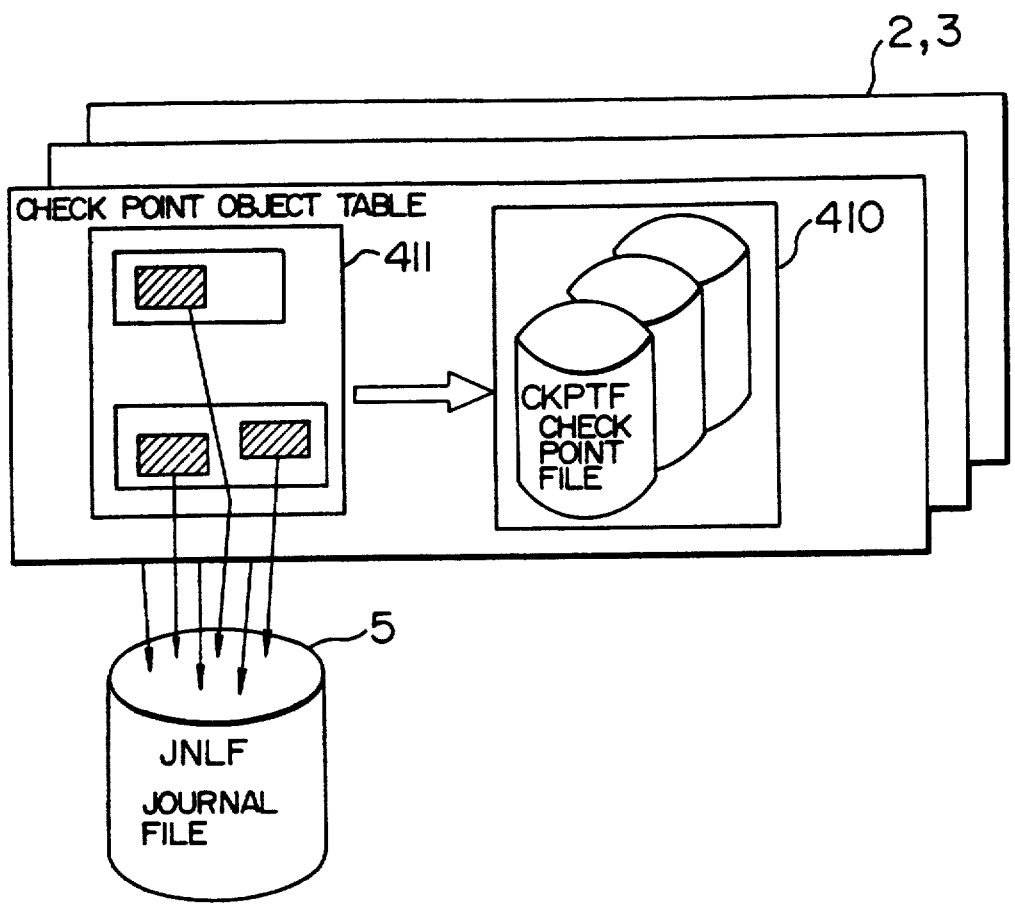
FIG. 6 is a diagram showing the concept of check point dump aquisition.
Figure 7:
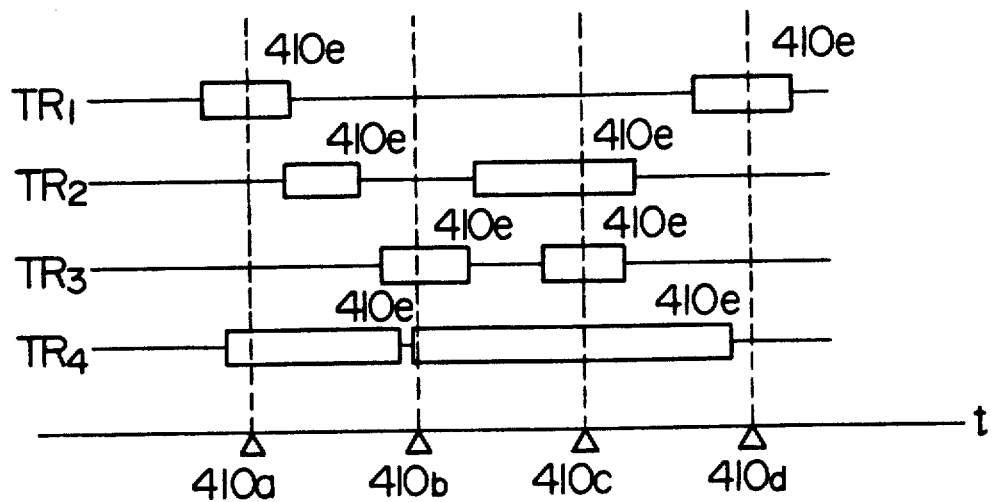
FIG. 7 is a timing chart of check point dump acquisition.
Figure 8:
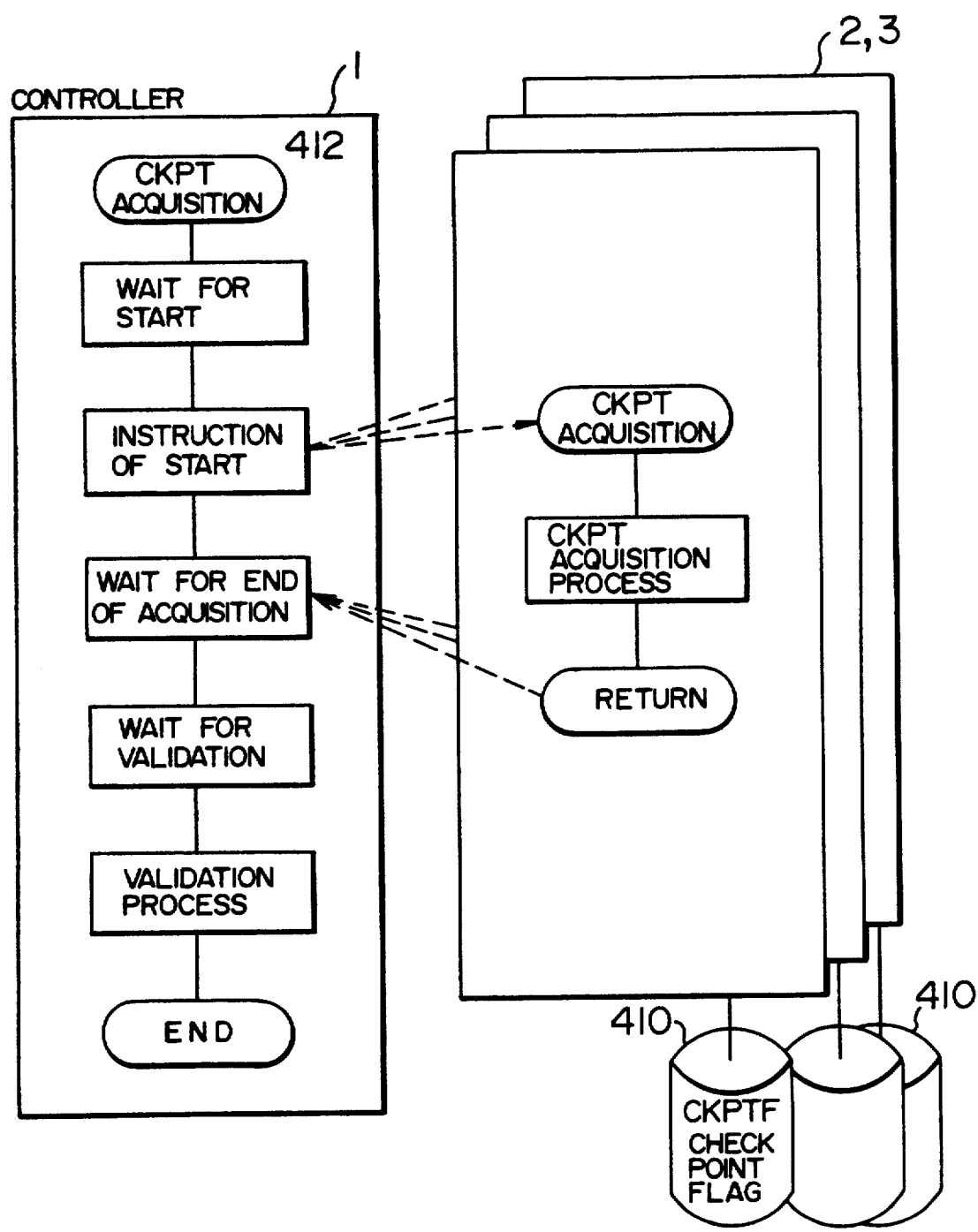
FIG. 8 is a flowchart of the check point dump acquisition process.

FIGS. 6, 7 and 8 show the concept of check point dump acquisition and the flow of the acquisition.

As shown in FIG. 6, the subsystems 2 and 3 stores periodically the contents of the check point subject table 411 in the virtual memory into the check point file (CKPTF) 410. The CKPTF 410 implements the generation control so that a fault which occurs during the storing of the check point dump can be recovered. At recovery following the occurrence of a fault in the system, the table can be recovered by superimposing information in the CKPTF 410 of the latest generation on updating information following the time of the check point stored in the JNLF 5. Periodic acquisition of the check point dump confines journal information which becomes necessary at the time of recovery following the occurrence of fault, and it is effective in reducing the volume of journals entered at the time of recovery and also in minimizing the recovery time.

Check point dump acquisition is carried out by each subsystem, and in this case the job process which uses the subsystem is not halted. On this account, there is a possibility of acquiring the table in the midst of updating as a check point dump. Even if table information in updating is acquired for the check point dump, the history type journal before the time of the check point is not necessary provided that the journal corresponding to the updating has been acquired after the time of the check point.

Check point acquisition takes place at four distinct time points including a check point time point 410a, check point dump acquisition start point 410b, acquisition end point 410c and check point dump validation point 410d, as shown in FIG. 6. The timings 410e of completion of journal acquisition corresponding to table updating are different for each transaction and they are not in synchronism, because of a finite time expended for check point dump acquisition. When the need of check point dump acquisition arises, the check point time point 410a is declared initially. A journal corresponding to table information which is being updated at this time point had possibly been acquired before the check point time point 410a, and therefore check point dump cannot yet be commenced. The system waits for the time when all updating processes which are active at the check point time point 410a are complete, and then begins check point dump acquisition. At the completion of check point dump acquisition, it is still possible that a journal corresponding to the updating has not been outputted, and the system waits until the time point when all journals corresponding to the processes which are being updated at the time of the check point dump acquisition end point 410c are outputted, and after that the check point dump validation point 410d is set. In case a fault occurs before expiration of the check point dump validation point 410d, the check point dump is not used, and recovery by the check point dump of the previous generation takes place.

In this embodiment, the check point dump is acquired in accordance with the flow shown in FIG. 8. Initially, the controller 1 initiates a check point dump acquisition task 412 when the number of journal outputs has reached a certain number (850). The initiated task 412 declares the check point time point, stores the journal serial number at this time point as a check point time point journal serial number 815 in the virtual memory controlled by the controller, and then waits for the commencement of check point acquisition: (851). When the check point acquisition commencement is enabled, the controller directs each subsystem to have check point dump acquisition (852). Each subsystem follows the check point dump acquisition instruction to acquire the check point dump in the CKPTR 410 of each subsystem (860, 862). Upon completion of acquisition, each subsystem reports the end of acquisition to the controller 1 (864). The controller 1 confirms the acquisition end report from each subsystem, and then waits for the check point dump validation (856). When the check point dump validation is enabled, the controller records the validation bit in the CKPTF 410 and SYSSF 9 (858), terminates the check point dump acquisition (859), and waits for the next acquisition timing.

The same method is used for the check point dump acquisition commencement wait and check point dump validation wait. The method will be described with reference to FIG. 9.

Figure 9:
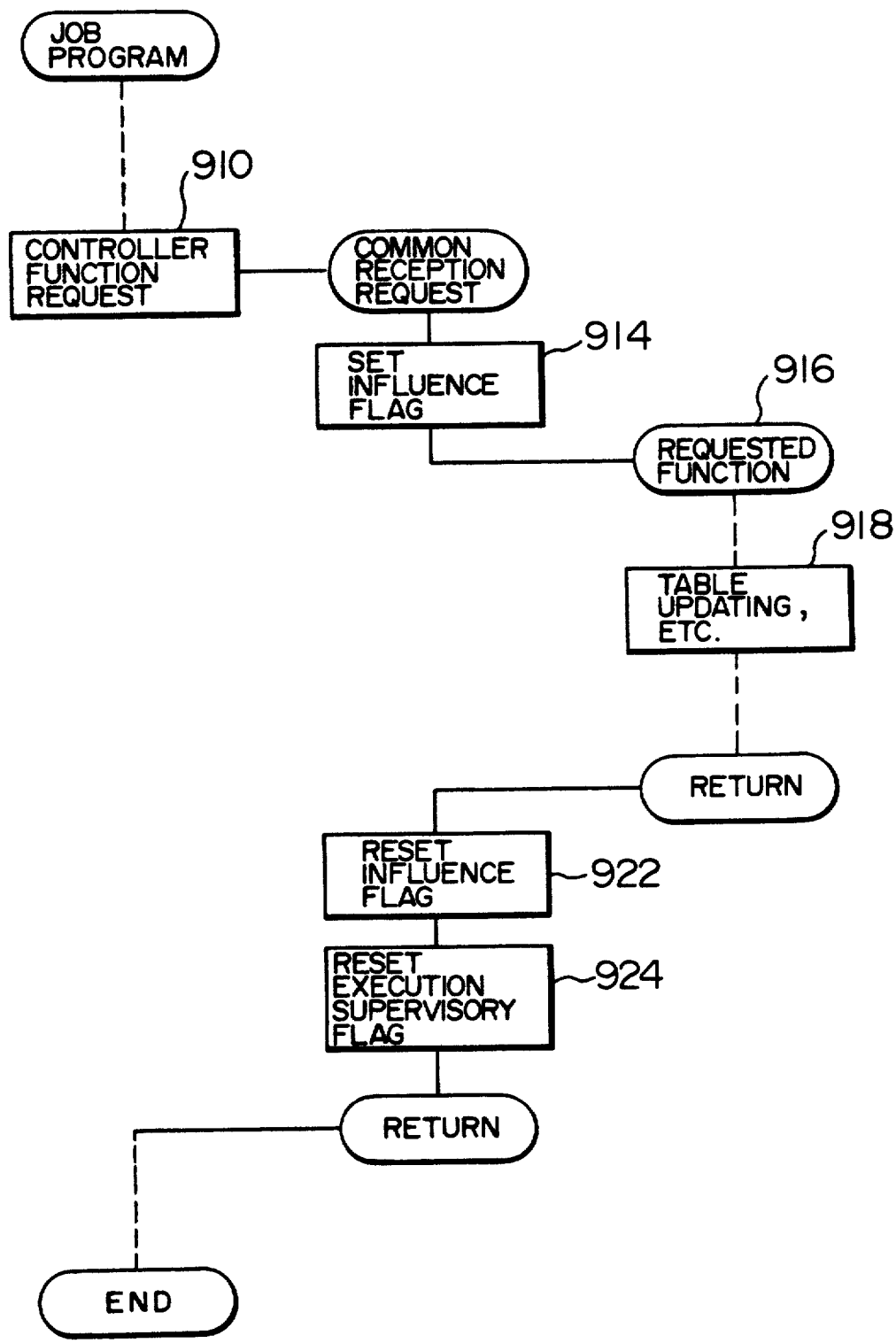
FIG. 9 is a flowchart of the check point dump validation method.

In FIG. 9, each transaction, when using a function including table updating which is an object of the check point, sets the affection flag 711 in the transaction management table 7 (914), and reset the affection flag 711 and execution supervisory flag 712 at the end of use of the function (922, 924). This flag operation is implemented by the common routine for the transition to a processing routine. In case the operation does not take place through the common routine, the method of declaring the commencement and termination in the process of each subsystem may be adopted.

Figure 10:
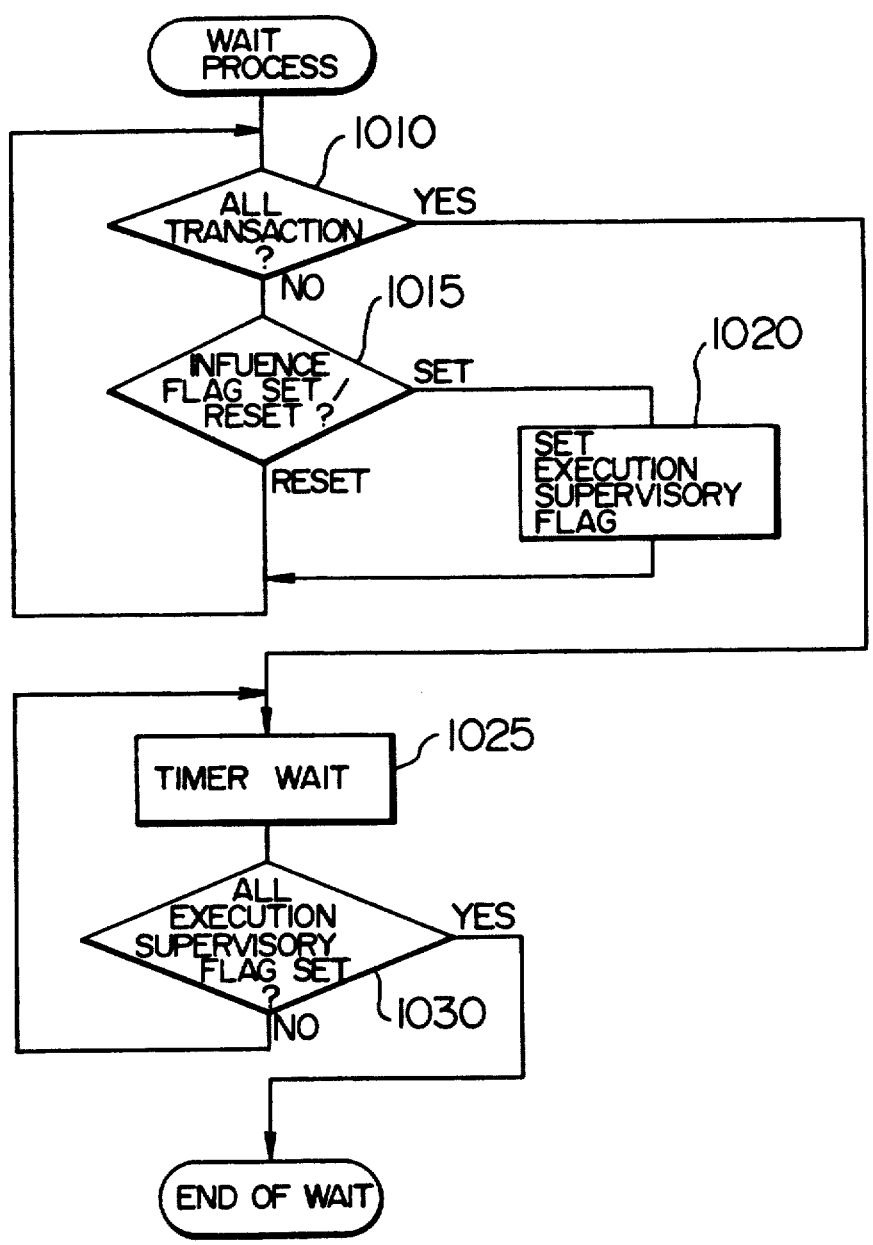
FIG. 10 is a flowchart of the wait process in check point dump acquisition.

In FIG. 10, in order for the check point dump acquisition task 412 in the controller to have a check point dump commencement wait or to commence the validation wait, it sets the execution supervisory flag 712 if the affection flag 711 is set (1015) for all transactions (1010) in the transaction management table 7 (1020). After that it enters the timer wait condition (1025), and checks whether the execution supervisory flag 712 is reset at each activation (1030). When all execution supervisory flags 712 are reset, all processings including table updating are terminated at the time of the wait commencement (1035).

At the time of the check point dump output, journal pointer information, which will be described later, and logical information for the resource management table are saved, so that recovery can take place even if journal information and resource management information earlier than the check point time are absent. The transaction management table 7 is a check point dump object table 411, and it can be recovered. Saving of logical information of the resource management table 6 is implemented in the form of a resource management logical information table 750 shown in FIG. 11. The resource management logical information table 750 is created by tracking the transaction ID 701 of the transaction holding the resource from a resource node 620 in the resource management table 6 shown in FIG. 3 to a resource exclusive node through the link 622 for all resources in the resource management table 6 to obtain the resource exclusive node 630, and storing the resource name 751 and transaction ID 752 in a pair. At this time, pairs to be outputted are resource holding information outputted to the journal before the check point time, and resource holding information after the check point is recovered from the journal, a will be described later.

Figures 11, 12:
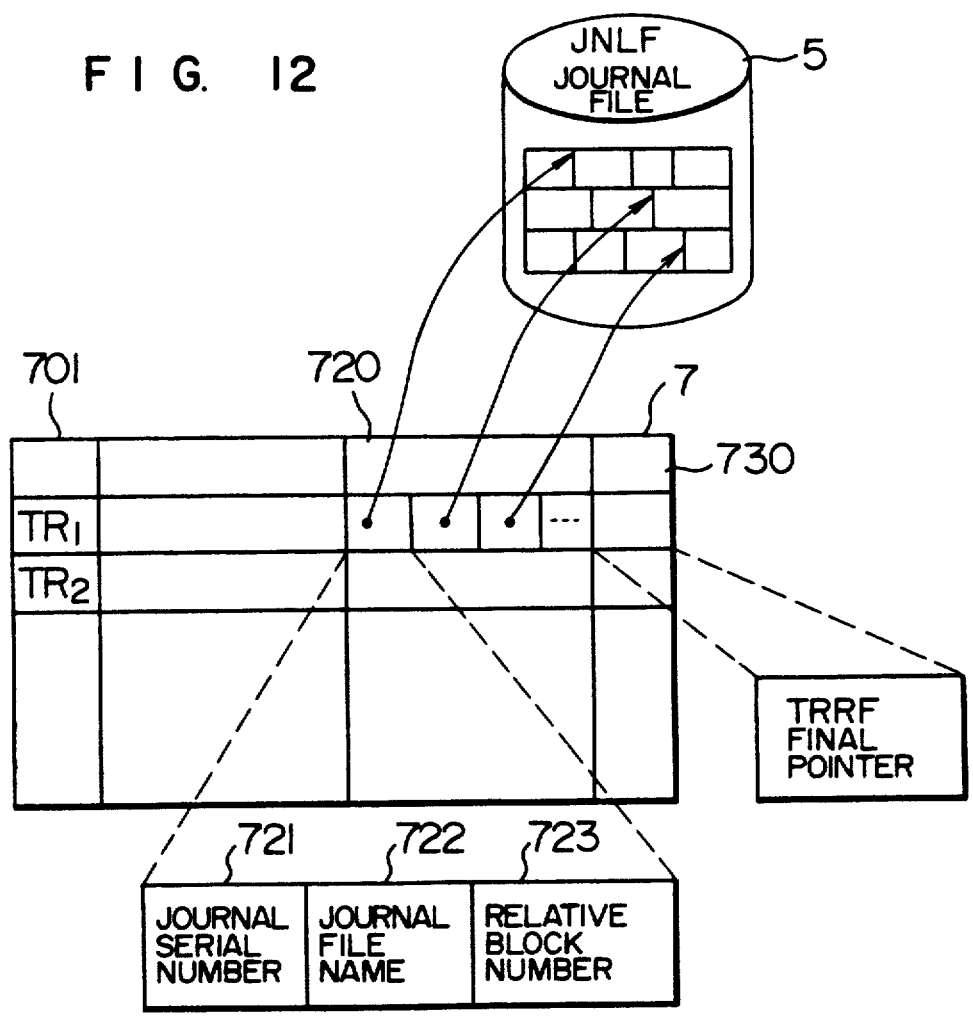
FIG. 11 is a diagram showing the resource management logical information table.
FIG. 12 is a diagram showing the journal pointer.
Figure 13:
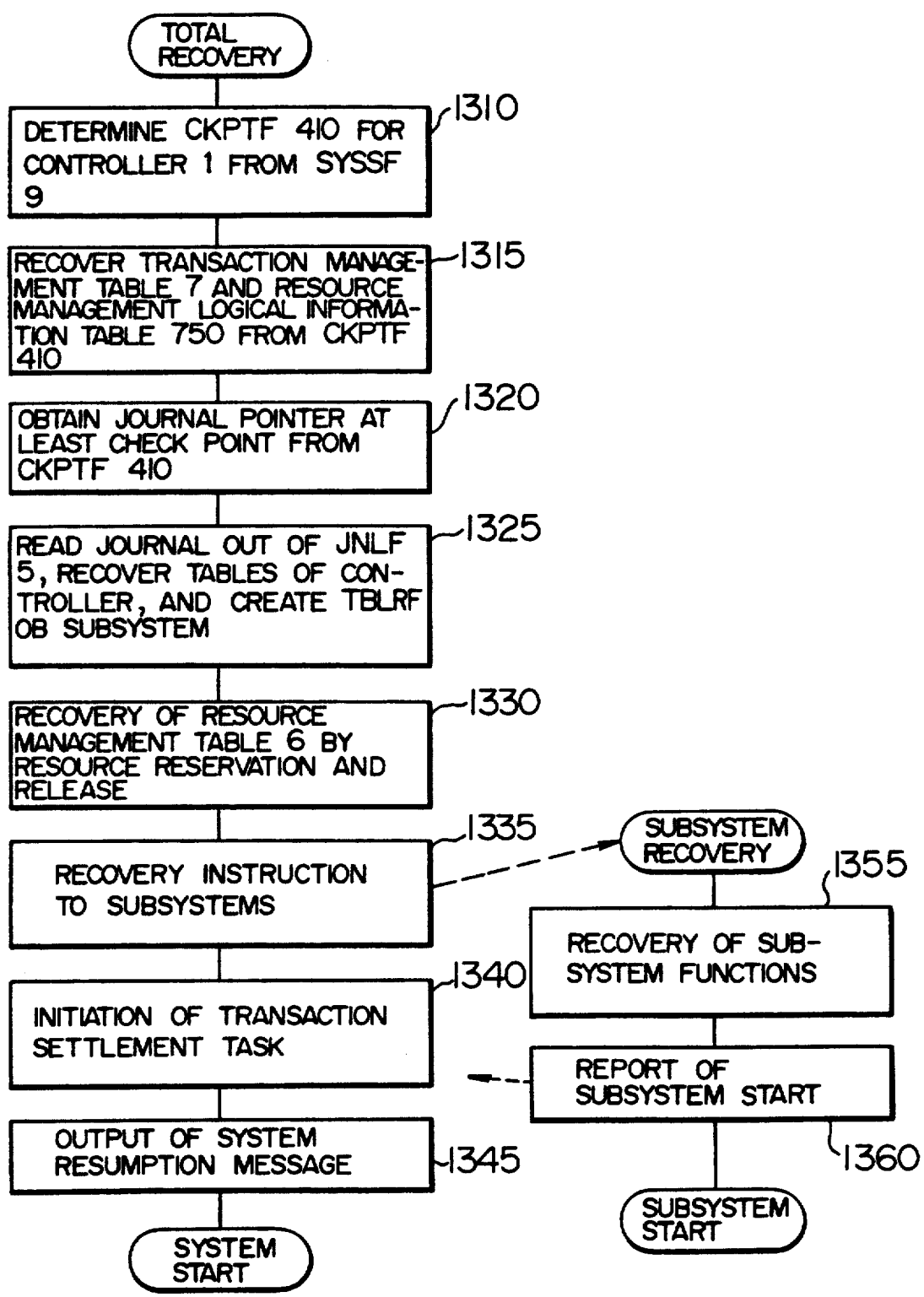
FIG. 13 is a flowchart of the total recovery process.

In outputting a journal into the JNLF 5 in the external storage, a journal pointer 720 in the form shown in FIG. 12 is produced for all transaction type journals existing in the output buffer, and it is saved in the transaction entry of the transaction management table 7. The pointer 720 consists of a journal serial number 721, a file name 722 of JNLF 5, and a relative block number 723 counted from the top of the file, and the journal outputted by the transaction can be retrieved at a necessary time point using the pointer. At the occurrence of a fault, if the controller 1 is not down, the journal can be obtained directly using the journal pointer without the need of search at transaction recovery.

At output of the check point dump, the journal is read out of the JNLF 5 using the journal pointer 720 prior to the validation for the transaction which exists at the time of check point dump validation 410d, and saved in the transaction recovery file (TRRF) 430. Whether the journal is to be saved or not is determined by making reference to the journal serial number 721 at the journal pointer 720 in the transaction management table 7, i.e., if the number precedes the journal serial number 815 at the check point time point 410a, the journal is saved, or if the number is after the serial number 815, indicative of a journal existing in the JNLF 5 after the check point time, it is not saved.

In this embodiment, a certain area of the TRRF 430 is allotted to each transaction prior to the commencement of the transaction.

In the case of saving the journal, the transaction management table 7 is additionally written so that information in the TRRF 430 which has been saved at the time of the check point of the previous generation is not lost. The TRRF final pointer 730 points to the top of the area in the TRRF 430 which has been allotted to the transaction at its occurrence, and it advances at each following journal saving and always points to the end of the used area allotted to the transaction in the TRRF 430.

By saving the journal information in the TRRF 430, journals earlier than the check point time becomes unnecessary, after check point acquisition, even for the check point recovery which has lasted longer since the time before the check point time. The TRRF 430 is arranged in entries in units of a transaction, and therefore data needed by the TRRF 430 and the journal following the check point time for the recovery is readily available even at the recovery in units of a transaction.

Furthermore, the resource retention information is outputted simultaneously at the time of the transaction type journal. This is done in such a way that in outputting the transaction type journal, resources held by the transaction is detected by tracking the resource management table 6 from the transaction node 610 to the resource exclusive node 630, and the resource retention information is outputted by appending it to the transaction type journal in the same form as the entry of the resource management logical information shown in FIG. 11.

At the time of recovery after a fault has occurred, the resource management logical information table held as a check point dump in the CKPTF 410 and the resource retention information outputted into the JNLF 5 together with the transaction type journal are used to repeat the resource reservation process, thereby recovering the resource management table 6. This allows the closure of the data base in a limited range (only portions which have been used), instead of the total closure of the data base, i.e., total prohibition of access to the data base, and the online system can be started up even if a subsystem is down or a transaction is not settled.

Recovery of the total failure of the composite subsystem type online system is called "total recovery", and recovery of a specific failed subsystem is called "subsystem recovery". The following describes the total recovery and subsystem recovery of the composite subsystem type online system.

Initially, the flow of total recovery of the composite subsystem type online system will be described with reference to FIGS. 13-17. In total recovery, the function of the controller 1 is recovered first. After that, each subsystem is recovered, and even if some subsystem functions cannot be recovered, the system can resume with the faulty functions being left inactive. In recovering the function of the controller 1, the SYSSF 9 determines the CKPTF 410 for the controller (1310), and the CKPTF 410 recovers the transaction management table 7 in the controller. The resource management logical information table 750 is also recovered (1315). By reading the controller CKPTF 410, a journal serial number at the time of the current latest check point and a journal pointer 815 for the journal of the journal serial number are determined (1320).

Figure 14:
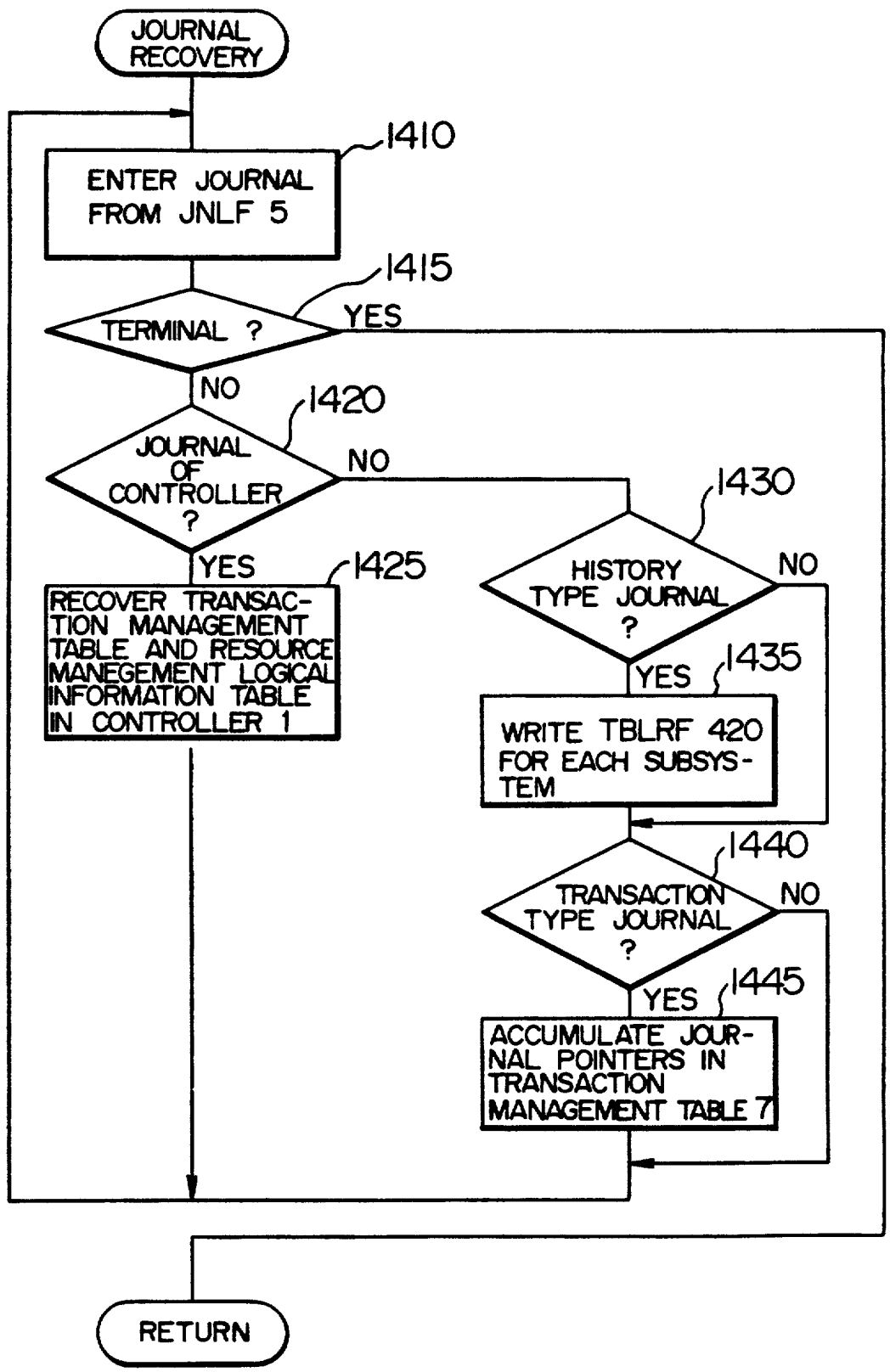
FIG. 14 is a flowchart of the journal recovery process.
Figure 15:
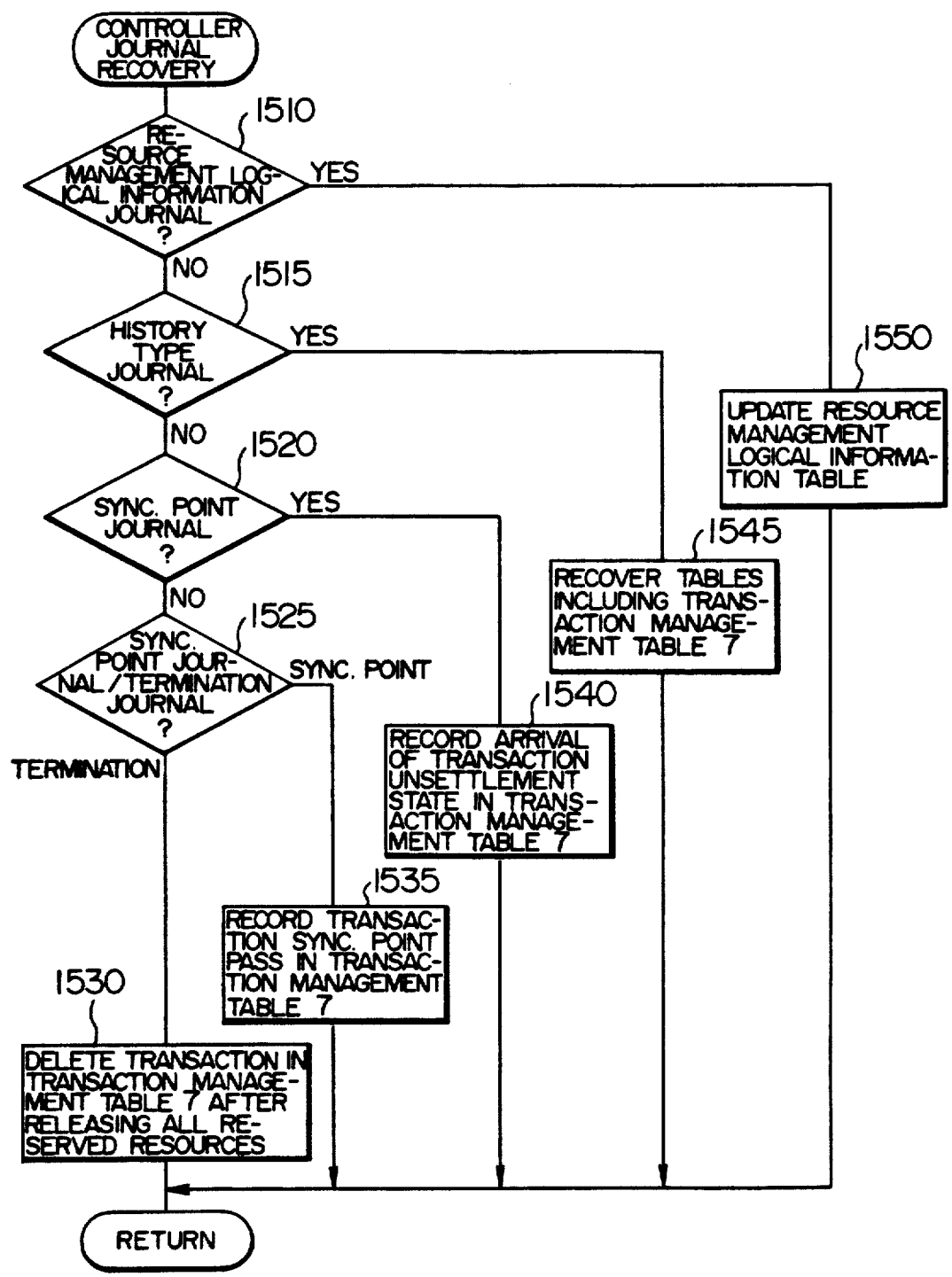
FIG. 15 is a flowchart of the journal recovery process by the controller.

Next, the JNLF 5 is read sequentially from the position indicated by the journal pointer 815 at the time of latest check point, as shown in FIG. 14. The readout journal, if it is a history type journal outputted by the controller, is used as information for updating the transaction management table 7 and resource management logical information table 750 in accordance with the flow of FIG. 15, thereby restoring the states at the occurrence of a fault in the transaction management table 7 and resource management logical information table 750. History type journals provided by other than the controller are outputted to the TBLRF 420 of the output subsystem. In case of a transaction type journal, it is stored in the form of journal pointer in the area of the journal pointer 720 of the respective transaction entry of the transaction management table 7. The transaction management table 7 has each transaction entry recording the sync point pass status, if the sync point journal is found, by setting the sync point pass flag 715, or the entry is eliminated if the termination journal is found.

In case the sync point preparation journal exists, as on the distributed server side of the distributed data base, if the sync point preparation journal is found, the sync point preparation pass flag 717 is set to record the sync point preparation state. If the sync point journal is found, the sync point preparation pass flag 717 is reset and the sync point pass flag 715 is set. If the termination journal is found, the entry is eliminated.

At the time when the reading of the journal has been completed, the history type journal of each subsystem is already outputted by being classified in the TBLRF 420 for each subsystem. The transaction management table 7 has been recovered up to the time of the fault, and only transactions which have existed at the time of the fault are registered. At this time point, all transactions in the transaction management table 7 have their freeze-need flags set. The entry for each transaction has been recovered inclusive of the area of journal pointer 720.

For the resource management logical information, the states at the latest check point and updated information after that are all ready to use. Upon completion of reading of journals, the resource reservation and release operation are repeated to recover the resource management table 6. All exclusive nodes 630 of the recovered resource management table 6 are brought to a frozen state. If resource reservation is newly attempted for the frozen resource, the exclusive node 630 is not made because of the frozen state, and the resource reservation request will fail. Accordingly, by bringing the resource management table 6 to a frozen state, the resource which has been in use at the occurrence of fault can be placed temporarily in a prohibited state, and even if a new transaction arises, it is treated as error if it needs a resource which can be executed, but is prohibited from use, and it is not required to wait for a long time. Namely, at the time when recovery and freezing of the resource management table 6 has been completed, recovery of the controller 1 terminates. At this time, a system ready message is issued, but the subsystem is not yet recovered, and the composite subsystem type online system as a whole does not start.

Another method is to freeze the resource at the first time when settlement fails, as will be described later. In this case, a transaction which has access to the same resource will wait, but this waiting merely lasts until the end of settlement and the influence of the fault can be minimized.

Next, recovery of the subsystems begins. Each subsystem is directed by the controller 1 to implement the recovery process in parallel. Each subsystem bases the recovery on the history type journal stored in the TBLRF 420, and completes the process when the recovery object tables within the subsystem are recovered. At this time point the composite subsystem type online system starts operating. If a subsystem has failed to recover, it is left inactive. Even at this time, transactions which have operated at the occurrence of a fault are not yet recovered, but all of these transactions are in freeze-need, and will be recovered by the freeze settlement process for transactions, as will be described later. Newly arising transactions are executed as they should be.

After the recovery instruction has been issued to each subsystem, the controller 1 recovers all resources (generally a data base) accessed by all transactions with their freeze-need flag in the transaction management table 7 being set, in parallel to the recovery of the subsystems. The controller 1 commences the process for transaction recovery. This is called a "freeze settling process", and FIG. 16 shows the flow of the process.

In the freeze settling process, the freezing process for transactions in freeze-need takes place (1610). Freezing of a transaction signifies halting of the transaction instead of terminating it, and information which will be needed for recovery is preserved.

Figure 16:
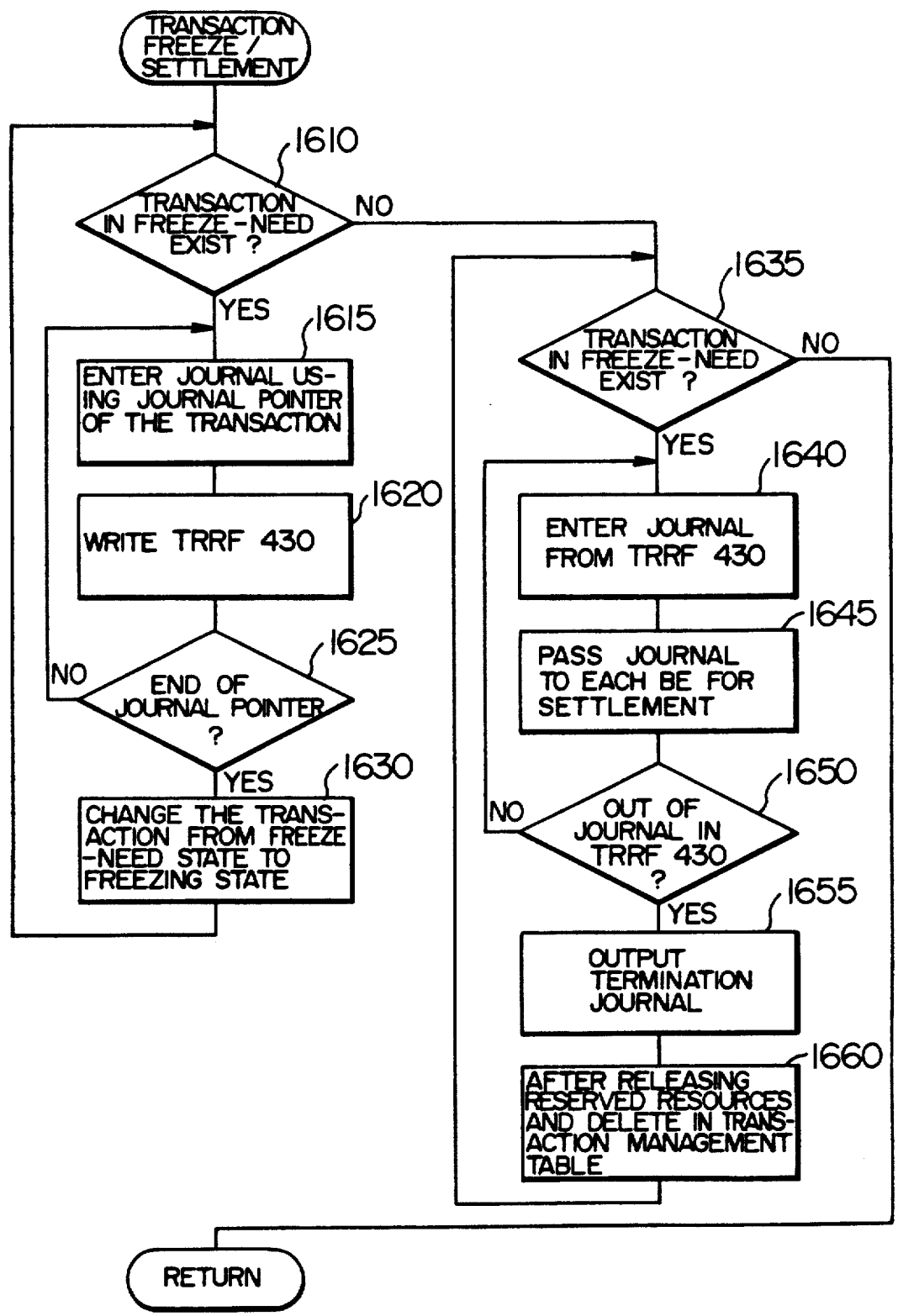
FIG. 16 is a flowchart of the transaction freezing/settling process.

In the transaction freezing process, the journal which has been outputted by the transaction is read out of the JNLF 5 on the basis of the journal pointer 720 in the transaction management table 7 as shown in FIG. 16 (1615). The readout journal is written additionally into the transaction recovery file TRRF 430 from the position of the final pointer 730 of TRRF, in the same way as the check point dump output (1620). In regard to the journal pointer 720 of the transaction, the freezing process for the transaction is completed at the time when all journals have been saved in the TRRF 430 (1625), and the freeze-need flag is reset and freezing flag is set (1630). When the transaction is frozen, all journals necessary for the recovery of the transaction are stored in the TRRF 430. The reason for this is that journals of the transaction which had been outputted before the latest check point are already saved in the TRRF 430 at the time of the check point, and journals after the check point have been saved in the TRRF 430 in the freezing process using the journal pointer 720.

Transactions in a frozen state, i.e., transactions with the freezing flag being set, are selected periodically by the controller 1 from the transaction management table 7, and resources held by the transactions are recovered. The recovery of resources is determined from the presence or absence of the sync point journal. If the sync point journal is present, i.e., if the sync point pass flag 715 is set, updating is completed on the basis of the journal. This is called "roll forward". If the sync point journal is absent, i.e., if the sync point pass flag 715 is reset, updating of the transaction is invalidated and the already updated portion is restored to the previous state on the basis of the journal. This is called "roll back". The roll forward and roll back operations are called comprehensively "settlement of a resource" or "settlement of a transaction".

In the settling process, a transaction with the freezing flag 716 in the transaction management table 7 set, is selected (1635), and the state of the transaction is checked with the sync point pass flag 715 in the transaction management table 7. If the sync point has been passed, the roll forward process takes place, or if the sync point is not yet passed, the roll back process takes place. The roll forward and roll back operations are performed in such a way that the BE area 703 used for the transaction is determined from the area BE 703 used by the transaction management table 7, and roll forward or roll back is instructed to all BE in use. For taking the instruction, the TRRF 430 is read in advance, a table of journals related to the BE of the transaction is created in the virtual memory, and it is passed to the BE (1640). The BE 3, if it has already recovered and the BE function has recovered, implements the settlement of the resource on the basis of the given journal (1645). After recovery, the exclusive node of the resource which has been frozen is released, the resource is released, and the freezing flag 716 is reset (1660). In case the BE itself has not recovered or cannot recover, the transaction is left in frozen. Accordingly, even if the recovery process is not terminated due to an unrecoverable BE, the unrecovered range can be confined to a group of transactions which have updated the data base of the BE.

Figure 17:
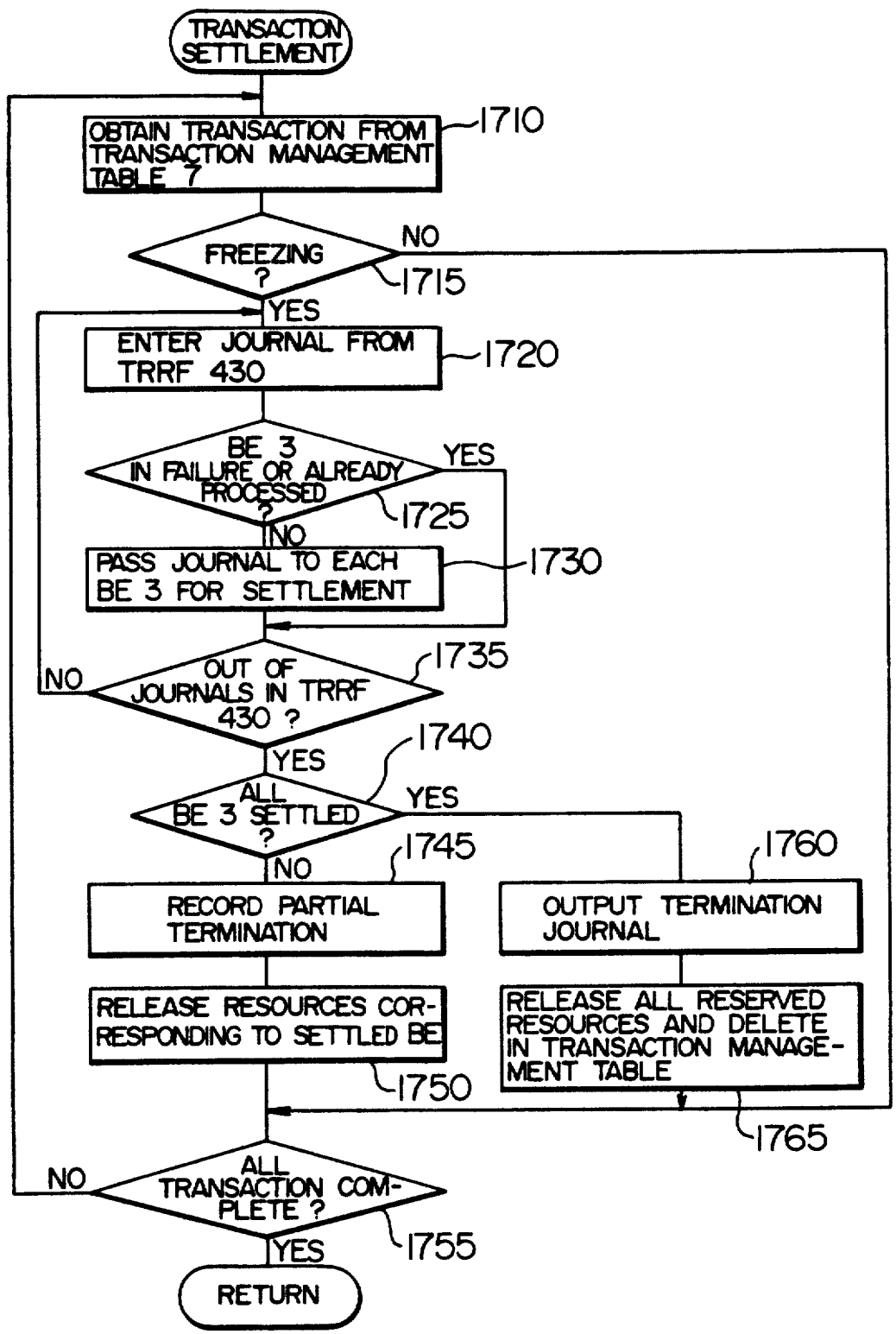
FIG. 17 is a flowchart of the settling process of the case where one transaction updates a plurality of BE.

FIG. 17 shows the settling process of the case where the data base of a plurality of BE is updated by one transaction. In this case, a journal from TRRF 430 is entered (1720), and if the BE 3 to which the input journal is to be passed is in failure (1725), the journal is skipped and the remaining journals in the TRRF 430 are processed continuously. If there is a journal which has been skipped due to the fault of BE 3 after the journal termination in the TRRF 430 (1735), a partial termination journal for already processed BE 3, except for the faulty BE 3, is outputted (1745), resources corresponding to the already settled BE are released (1750), and the transaction is left in a frozen state. For the processed BE 3, the completion of the process is recorded in the used BE entry in the transaction management table (1765). In case the settling process is executed, if the input journal from the TRRF 430 is the journal of the already processed BE 3, a reading thereof is skipped. Accordingly, in the recovery process of the case where some transaction has updated the data base of a plurality of BE, when part of BE is in failure, only recovery for the faulty BE of the transaction is suspended, and by completing the recovery process for the recoverable BE, the unrecoverable range can be minimized.

In the case of the distributed server side of the distributed data base, the subsystem is equivalent to the FE 2, and the states before sync point pass are divided into the state at the sync point preparation and the state before the sync point preparation. For the state before the sync point preparation, the roll back process takes place, and for the state after passing the sync point, the roll forward process takes place. In case of the sync point preparation state, an inquiry is made to the distributed client which has generated the transaction from the distributed server of the distributed data base, and if the transaction corresponding to the distributed client side has passed the sync point, the roll forward process takes place, or if the sync point is not yet passed, the roll back process takes place. The distributed client to be questioned from the distributed server and the transaction identification information are recorded in the generation FE entry 702 of the transaction management table 7 at the occurrence of a transaction.

In case a distributed data base subsystem within the same system is in failure or another processor side is in failure, only a transaction in the sync point preparation state is left unsettled, and other transactions are settled in accordance with the flow shown in FIGS. 16 and 17.

In case of the distributed client side of the distributed data base, the subsystem is equivalent to the BE 3. In the flow of FIG. 17, the controller 1, if the distributed client is recorded in the used BE entry in the transaction management table 7, issues an instruction of roll back or roll forward to the distributed client at journal pass processing to each BE 3. The distributed client sends the instruction t the distributed server side. The distributed server side, if the transaction which has received the instruction is in the sync point preparation state and in case of a roll forward instruction, makes the sync point pass state. In case of a roll back instruction, it makes the state before sync point preparation, and it implements each settling process.

In case a transaction of the distributed server side has further made a request to the distributed data base of another processor, it can be treated in the same way by merely making correspondence in the case of using the distributed client in the system as a BE of the transaction.

Figure 18:
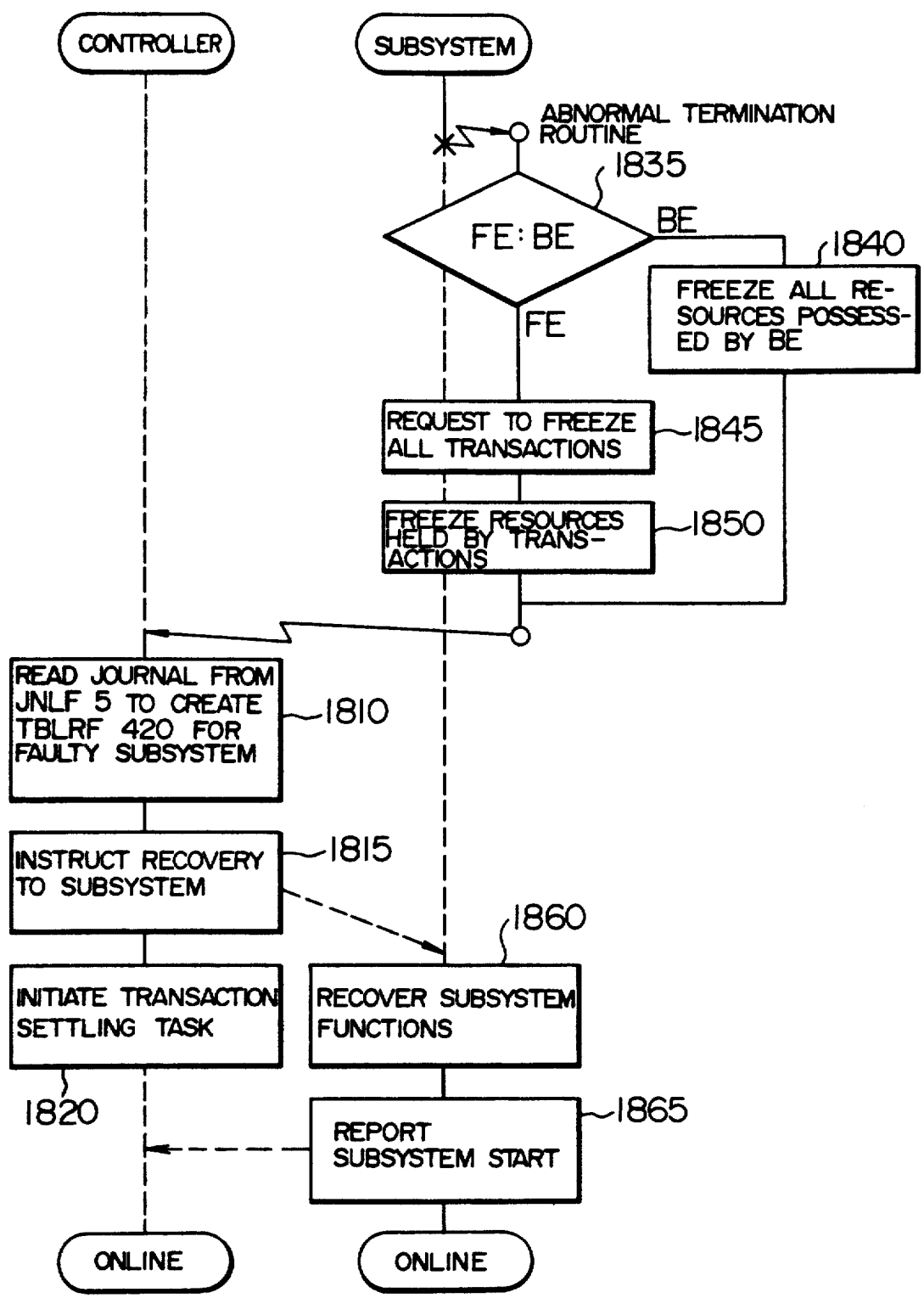
FIG. 18 is a flowchart of the subsystem fault recovery process.

Next, the fault recovery of a subsystem will be described with reference to FIG. 18.

In the composite subsystem type online system, if a fault has occurred in a subsystem, only the subsystem is treated as faulty and subsystem recovery is carried out. The method of subsystem recovery differs between FE 2 and BE 3.

For the recovery of a fault in the FE 2, it is necessary to recover the function of the subsystem and all transactions generated by the subsystem. In case of a fault only in the subsystem, the transaction management table 7 possessed by the controller 1 exists in the virtual memory, as it should be, and in the routine invoked at the abnormal termination of the subsystem, reference is made to the generation FE area 702 of the transaction management table 7 to set the freeze-need flag 713 for all transactions generated by the subsystem. Transactions generated by the faulty FE 2 are confined by making reference to the transaction area 702 in the transaction management table 7. Therefore, a fault of the FE can be confined to the transaction which has generated the FE, and for transactions generated by another FE, the job process can be implemented without being affected. When the controller detects a subsystem down condition, it reads out the JNLF 5 sequentially beginning with the latest check point, as in the total system down condition, and stores the history type journals related to the faulty subsystem in the TBLRF 420 of the system (1810). After that, the controller 1 restarts the subsystem, and issues a recovery instruction to the restarted subsystem (1815). Receiving the recovery instruction, the subsystem performs the recovery function on the basis of the CKPTF 410 and TBLRF 420 (1860).

In parallel to the function recovery for the subsystem, the controller 1 freezes all transactions with the freeze-need flag 713 in the transaction management table 7 being set in accordance with the flow of FIG. 16 in the same manner as the total recovery, thereby implementing the settlement (1820). Because the resource management table 6 is under control of the controller 1, it is still effective at the time of subsystem failure and recovery, the fault generation FE 2 can commence the process of a new transaction without waiting for the transaction freezing and settlement by the controller 1, provided that the function of the subsystem has recovered.

For the recovery of a fault in the BE 3, it is necessary to recover the function of the subsystem and transactions which have been using the BE. Because the transaction management table exists in the virtual memory, as in the case of a fault of FE 2, the roll back need flag 714 is set for all transactions which have been using the BE, by making reference to the used BE area 703 of the transaction management table 7, in the routine invoked at the abnormal termination of the BE 3. Since transactions which have used the faulty BE 3 are confined in the used BE area 703 of the transaction management table 7, the fault of the BE can be confined to transactions which actually use the BE, allowing transactions using other BE to proceed with their job processings without being affected.

Resources which have been under control of the BE 3 cannot be released until the fault recovery for the BE 3 is completed, and the resources are frozen (1840). Freezing of resources is implemented in the routine invoked at the abnormal termination of the BE 2 for all resource nodes 630 linked to the BE 3. Another conceivable method of resource freezing is that the resources are simply placed in freeze-need at the occurrence of a fault so that freezing is suspended until the end of transaction settlement. Consequently, other transactions requesting the same resources will have a temporary wait, instead of error return, and they can proceed with processing as if no fault has occurred once the transactions holding the resources are settled normally.

When the controller 1 detects a subsystem down condition, it produces TBLRF 420 from JNLF 5, as in a fault of FE 2. After that the controller 1 restarts the BE 3 and issues a recovery instruction to it. In response to the recovery instruction, the BE implements the recovery function of the BE on the basis of the CKPTF 410 and TBLRF 420. Some kinds of BE do not necessitate the CKPTF 410 and TBLRF 420. In such a case, the controller 1 does not read the JNLF 5, but simply issues a recovery instruction, and the BE implements the function recovery.

The controller 1 waits for the recovery of the function of the subsystem, and freezes all transactions with their roll back need flag 714 being set in the transaction management table 7 in accordance with the flow of FIG. 16, as in the total recovery, thereby implementing the settlement in the direction of roll back.

As has been described in connection with the fault recovery of subsystems, the influence of a subsystem failure is confined to specific transactions using the generation FE area 702 and used BE area 703 in the transaction management table 7. By this facility, when some subsystem fails, other subsystems can have normal processings, and the operation of the composite subsystem type online system can be continued. The provision of the RF 4 allows the faulty subsystem to recover, although it has a delay, without being affected by the progression of the process of other subsystems, and it can join in the stream without being affected by other subsystems.

Next, in the third place, if a fault occurs in a job processing program and a transaction in execution terminates abnormally, the freeze-need flag 713 of the transaction is set by the routine invoked at the abnormal termination. The controller 1 responds to the flag to freeze and settle the transaction, as in the total system down condition. The job processing program restores the function by being restarted by the FE 2.

As will be appreciated from the above description, this invention provides the following effectiveness for a composite system having a plurality of data bases and data communication systems on a plurality of processors.

(1) When the distributed data base access section as a subsystem of a composite subsystem type online system goes down, only transactions which need access to the distributed data base are closed, and access to a local data base can be continued.

(2) In case of a fault in some subsystem, other subsystems operate continuously, the fault can be recovered with a delayed start-up of the faulty subsystem.

(3) When a fault occurs, transactions which are failing due to a faulty data base are selected and the range of failure is confined, whereby the fault recovery process can be facilitated.

(4) The check point dump acquisition is commenced and validated without waiting for the termination of the transaction, and once the check point dump is validated, the need of access to journals earlier than the check point time can be eliminated.

As will be appreciated from the above description, this invention makes it possible to effect the separation between a down condition of a distributed data base and a down condition of a local data base without the need of providing a new control facility for the distributed data base. By merely constructing a distributed data base access function as a subsystem of the composite subsystem type online system, the enhancement of reliability can be achieved.

According to the calculation on assumption that the probability of a down condition of the composite subsystem controller is 0.01%, the probability of a down condition of each subsystem is 0.05%, and the proportion of transactions which need distributed access is 5%, the probability of a transaction which cannot be executed is reduced by 40% from 0.1% of the conventional case to 0.06% according to the inventive method.

We claim:

1. A composite system having a plurality of subsystems each including a data base system for processing and accessing a respective data base and a data communication system for performing data communications between said subsystem and said composite system, said composite system comprising:

first means for acquiring a journal in a journal file for fault recovery;

second means for acquiring check point information periodically in a check point file;

third means for saving a journal in a journal saving file for each transaction; and fourth means responsive to said first through third means, at the time of occurrence of a fault in one subsystem, for continuing the operation of other subsystems, and for implementing a fault recovery of said one subsystem even for a delayed start-up of the faulty subsystem;

wherein said third means saves, at each check point, a journal produced by a transaction which has been in operation at a check point, into said journal saving file.

2. A composite system according to claim 1, wherein said journal saving file is partitioned in units of a transaction and stores journals by arranging the journals for each transaction.

3. A composite system having a plurality of subsystems each including a data base system for processing and accessing a respective data base and a data communication system for performing data communications between said subsystem and said composite system, said composite system comprising:

first means for acquiring a journal in a journal file for fault recovery;

second means for acquiring check point information periodically in a check point file;

third means for saving a journal in a journal saving file for each transaction; and fourth means responsive to said first through third means, at the time of occurrence of a fault in one subsystem, for continuing the operation of other subsystems, and for implementing a fault recovery of said one subsystem even for a delayed start-up of the faulty subsystem;

wherein said fourth means reads out all journals after a check point time point and writes a necessary journal additionally into said journal saving file.

4. A composite system having a plurality of subsystems each including a data base system for processing and accessing a respective data base and a data communication system for performing data communications between said subsystem and said composite system, said composite system comprising:

a distributed data base access system, included in each subsystem of said composite system, for receiving data base access requests;

composite subsystem control means for controlling data base systems of said subsystems and sending access requests to said subsystems;

means for determining to which data base a transaction being executed by a subsystem has made an access request and causing said access request to be sent to a subsystem containing said data base;

means for, upon occurrence of a fault, determining a transaction that fails due to a fault in a data base and freezing the determined transaction; and means for processing the determined transaction as an object of fault recovery.

5. A composite system having a plurality of subsystems each including a data base system for processing and accessing a respective data base and a data communication system for performing data communications between said subsystem and said composite system, said composite system comprising:

a distributed data base access system included in each subsystem of said composite system for receiving data base access requests;

composite subsystem control means for controlling data base systems of said subsystems and sending access requests to said subsystems;

means for determining to which data base a transaction being executed by a subsystem has made an access request and causing said access request to be sent to a subsystem containing said data base;

means for, upon occurrence of a fault, determining a transaction that fails due to a fault in a data base and freezing the determined transaction; and means for processing the determined transaction as an object of fault recovery;

wherein when a transaction makes access request to an individual data base, the access request is received by said composite subsystem control means, and thereafter a requested data base is identified from the content of the access request, and the access request of said transaction is distributed to the data base after said means for determining has recorded that said transaction has accessed said data base.

6. A composite system having a plurality of subsystems each including a data base system for processing and accessing a respective data base and a data communication system for performing data communications between said subsystem and said composite system, said composite system comprising:

means for controlling said subsystems;

said means for controlling including means for acquiring a journal in a journal file for fault recovery, means for acquiring a check point information periodically in a check point file, means for waiting for the end of access by a transaction, which is in execution at a check point time point and is in access to a check point dump object table, and means for detecting starting time points and ending time points of two processes including updating of information in memory and acquisition of updated information in journal.

7. A composite system according to claim 6, wherein said waiting means comprises, for each transaction, a flag which indicates access to the check point dump object table and a flag which indicates that a transaction is in execution at a check point time point and is a questionable transaction.

* * * * *

UNITED STATES PATENT AND TRADEMARK OFFICE
CERTIFICATE OF CORRECTION

PATENT NO. : 5,065,311

DATED : November 12, 1991

INVENTOR(S) : K. Masai, et. al.

It is certified that error appears in the above-identified patent and that said Letters Patent is hereby corrected as shown below:

On the Title page, left-hand column, after "[22] Filed: April 20, 1988" insert:

```
item [30] Foreign Application Priority Data
     April 20, 1987  [JP] Japan ..............  62-95103
     July 24, 1987   [JP] Japan ..............  62-183331
     July 24, 1987   [JP] Japan ..............  62-183330
     September 11, 1987 [JP] Japan ..........  62-226319 --
```

Signed and Sealed this

Twenty-fifth Day of May, 1993

Attest:

MICHAEL K. KIRK

Attesting Officer

Acting Commissioner of Patents and Trademarks